US011530831B2

(12) United States Patent
Haynes et al.

(10) Patent No.: US 11,530,831 B2
(45) Date of Patent: Dec. 20, 2022

(54) SYSTEM FOR CONDITIONING AIR IN A LIVING SPACE

(71) Applicant: ZINNIATEK LIMITED, Auckland (NZ)

(72) Inventors: Andrew Leo Haynes, Auckland (NZ); Daniel Fernandez Gonzalez, Auckland (NZ)

(73) Assignee: ZINNIATEK LIMITED, Auckland (NZ)

( * ) Notice: Subject to any disclaimer, the term of this patent is extended or adjusted under 35 U.S.C. 154(b) by 496 days.

(21) Appl. No.: 16/485,280

(22) PCT Filed: Feb. 27, 2018

(86) PCT No.: PCT/IB2018/051205
§ 371 (c)(1),
(2) Date: Aug. 12, 2019

(87) PCT Pub. No.: WO2018/154534
PCT Pub. Date: Aug. 30, 2018

(65) Prior Publication Data
US 2020/0003443 A1   Jan. 2, 2020

(30) Foreign Application Priority Data

Feb. 27, 2017   (NZ) .................................... 729579

(51) Int. Cl.
*F24F 11/46*   (2018.01)
*F24D 3/18*    (2006.01)
(Continued)

(52) U.S. Cl.
CPC ................ *F24F 11/46* (2018.01); *F24D 3/18* (2013.01); *F24D 17/0021* (2013.01);
(Continued)

(58) Field of Classification Search
CPC .... F24F 11/46; F24F 2005/0064; F24F 3/001; F24D 3/18; F24D 17/0021;
(Continued)

(56) References Cited

U.S. PATENT DOCUMENTS 4,242,872 A * 1/1981 Shaw .................... F24D 11/003
62/235.1
4,380,156 A  4/1983 Ecker
(Continued)

FOREIGN PATENT DOCUMENTS

EP   2719956 A1 * 4/2014 .......... F24D 11/0242
FR   2979418 A1   3/2013
(Continued)

OTHER PUBLICATIONS

European Search Report on European Patent Application No. 18756974. 4, dated Apr. 30, 2021, 19 pgs.
(Continued)

*Primary Examiner* — Frantz F Jules
*Assistant Examiner* — Martha Tadesse
(74) *Attorney, Agent, or Firm* — Foley & Lardner LLP

(57) ABSTRACT

A system for providing air conditioning to a living space and heating potable water. The system comprising a heat pump circuit comprising a compressor for circulating a refrigerant around the heat pump circuit, a first condenser, a second condenser and an evaporator. The evaporator being adapted
(Continued)

to receive a first flow of air from an air inlet to transfer heat from the first flow of air to the refrigerant. The first condenser being adapted to receive a flow of water to transfer heat from the refrigerant to the water. The second condenser being adapted to receive a second flow of air to transfer heat from the refrigerant to the second flow of air. The first flow being provided from the evaporator to a living space by an air outlet.

40 Claims, 18 Drawing Sheets

(51) Int. Cl.
    *F24D 19/10*     (2006.01)
    *F24D 17/00*     (2022.01)
    *F25B 6/02*     (2006.01)
    *F25B 13/00*     (2006.01)
    *F25B 40/02*     (2006.01)
    *F24F 5/00*     (2006.01)

(52) U.S. Cl.
CPC ............ *F24D 19/1093* (2013.01); *F25B 6/02* (2013.01); *F25B 13/00* (2013.01); *F25B 40/02* (2013.01); *F24D 2200/14* (2013.01); *F24F 2005/0064* (2013.01); *F25B 2313/021* (2013.01); *F25B 2339/047* (2013.01)

(58) Field of Classification Search
CPC ............ F24D 19/1093; F24D 2200/14; F24D 11/0264; F24D 11/003; F25B 6/02; F25B 13/00; Y02B 30/12; Y02B 30/13
See application file for complete search history.

(56) References Cited

U.S. PATENT DOCUMENTS

| | | | |
|---|---|---|---|
| 4,856,578 A * | 8/1989 | McCahill | F25B 13/00 62/238.7 |
| 5,228,302 A | 7/1993 | Eiermann | |
| 2009/0229286 A1 * | 9/2009 | Ellis | F24F 3/153 165/108 |
| 2012/0247134 A1 * | 10/2012 | Gurin | F25B 27/002 62/235.1 |
| 2014/0020637 A1 | 1/2014 | Yamin | |
| 2014/0260358 A1 | 9/2014 | Leete et al. | |

FOREIGN PATENT DOCUMENTS

| | | |
|---|---|---|
| WO | WO-2010/058397 A1 | 5/2010 |
| WO | WO-2015/132756 A1 | 9/2015 |
| WO | WO 2016/079424 A1 | 5/2016 |

OTHER PUBLICATIONS

Written Opinion regarding International Application No. PCT/IB2018/051205, dated Jun. 8, 2018, 7 pp.

* cited by examiner

Solar roof at Kumamoto F-wave facilities

Low ambient temperature conditions(< 10°C)

Medium ambient temperature conditions (10-20 °C)

SYSTEM FOR CONDITIONING AIR IN A LIVING SPACE

CROSS-REFERENCE TO RELATED APPLICATIONS

This Application claims the benefit of priority to international patent application number PCT/IB2018/051205, having a filing date of Feb. 27, 2017, which claims the benefit of New Zealand Application No. 740315, having a filing date of Feb. 28, 2018, the complete disclosures of which are hereby incorporated by reference for all purposes.

FIELD OF THE INVENTION

The present invention relates to a system for conditioning air to be provided to a living space, for example heating or cooling air as required to achieve a comfortable temperature within the living space. In some embodiments the present invention additionally relates to using solar thermal collection to heat air for air conditioning and/or to heat potable water.

BACKGROUND TO THE INVENTION

Solar thermal collection systems collect solar energy from the solar spectrum as heat via a thermal collector. For instance, a solar thermal collection system may be installed on the roof of a building in order to collect solar energy used to heat water or the environment within the building. Referring to the FIG. 1, a solar thermal system 1 is shown. The solar thermal system 1 may include a solar collector consisting of an outside cladding or external membrane 2 (e.g., one or more roofing tiles) forming a cavity 8 with the underlying support material 12 of the building structure. The system is configured to collect heat from solar energy by extracting air from the cavity that has been heated by solar radiation received by the cladding. A thermal collection unit 4 (e.g., a thermal box) may be mounted underneath the external membrane and connected to the cavity to collect and direct air flow from the cavity. The system may also include ducts (i.e., a ducting system) to direct the flow of air within the solar thermal system, to the living space or to vent to the ambient environment for example via an opening 14 at a vented ridge 6 of the building, or to a heat exchanger to heat another medium, for example to heat potable water. A thermal collection system is described in WO2015/132756.

Thermal energy provided by a collection system may not be sufficient to provide sufficient heat to heat a living space and/or water. Additional heating capacity may be required from a secondary or additional energy source. A heat pump may be used to provide water heating and living space cooling, However, such a system can only be used to provide cool air when hot water heating is also required, and vice versa.

In this specification where reference has been made to patent specifications, other external documents, or other sources of information, this is generally for the purpose of providing a context for discussing the features of the invention. Unless specifically stated otherwise, reference to such external documents is not to be construed as an admission that such documents, or such sources of information, in any jurisdiction, are prior art, or form part of the common general knowledge in the art.

SUMMARY OF THE INVENTION

It is an object of the present invention to provide an improved system for conditioning air for a living space, or to provide an improved system for conditioning air and heating water, or to provide an improved system for conditioning air using both solar thermal energy and an further energy source, or to at least provide the public with a useful choice.

In one aspect, the present invention broadly consists in a system for providing air conditioning to a living space and heating potable water comprising:

a heat pump circuit comprising a compressor for circulating a refrigerant around the heat pump circuit, a first condenser, a second condenser and an evaporator, the evaporator adapted to receive a first flow of air from an air inlet to transfer heat from the first flow of air to the refrigerant, and the first condenser adapted to receive a flow of water to transfer heat from the refrigerant to the water, and the second condenser adapted to receive a second flow of air to transfer heat from the refrigerant to the second flow of air, and an air outlet to provide the first flow of air from the evaporator to the living space.

In some embodiments, the first flow of air is a heated flow of air.

In some embodiments, the system further comprising a thermal collection unit to collect heated air from a solar thermal collection system for providing the first flow of air.

In some embodiments, the system further comprising the solar thermal collection system for providing the first flow of air.

In some embodiments, the system further comprising a valve for selectively providing as the first flow of air: i) heated air from a solar thermal collection system from the thermal collection unit, and ii) a flow of air from the living space such that the first flow of air recirculates through the system and the living space.

In some embodiments, the system further comprising a vent path to bypass the evaporator and vent the first flow of air to the ambient environment.

In some embodiments, the system further comprising a fan for driving first flow of air through the evaporator and to the living space.

In some embodiments, the system further comprising a fan for driving the first flow of air through the vent path.

In some embodiments, the second flow of air is an ambient flow of air.

In some embodiments, further comprising a fan for driving the second flow of air through the second condenser.

In some embodiments, the second flow of air is vented to ambient after passing through the second condenser.

In some embodiments, the system comprising a valve for selectively providing the first flow of air from the evaporator to i) the living space, and ii) a vent to ambient.

In some embodiments, further comprising a water circuit adapted to be connected to a (house hold) water tank and a pump for pumping water from the tank and through the first condenser to be returned to the tank.

In some embodiments, the heat pump circuit comprises:
a first heat exchanger configurable as the evaporator or the second condenser, a second heat exchanger configurable as the second condenser or the evaporator, and a valve for selecting the direction of flow of refrigerant in the heat pump circuit through the first and second heat exchangers, and wherein the first condenser is located within the heat pump circuit between the compressor and the valve, and with the valve in a first position:

the first heat exchanger configured as the evaporator to receive the first flow of air and transfer heat from the air to the refrigerant, and the second heat exchanger configured as the second condenser to receive the second flow of air to transfer heat from the refrigerant to the air, and with the valve in a second position:

the first heat exchanger configured as the second condenser to receive the first flow of air and transfer heat from the refrigerant to the first flow of air, and the second heat exchanger configured as the evaporator to receive the second flow of air to transfer heat from the air to the refrigerant, the system adapted to provide the first flow of air from the first heat exchanger to the living space to condition the air in the living space, and the first condenser adapted to receive a flow of water to transfer heat from the refrigerant to the water when the valve is in the first and second positions.

In some embodiments, the system, further comprising a heat exchanger (the passive heat exchanger) for receiving the water from the water circuit and the first flow of air to transfer heat between the water and the first flow of air.

In some embodiments, the water circuit comprises a valve for selectively bypassing the heat exchanger.

In some embodiments, the water heat exchanger and the first condenser are arranged in the water circuit in series.

In some embodiments, the water circuit heat exchanger and the evaporator or first heat exchanger of the heat pump circuit are arranged in the first flow of air in series.

In some embodiments, the thermal collection unit is a box or duct.

In some embodiments, the thermal collection unit comprises two outlets, a first outlet for providing a flow of air to the evaporator or first heat exchanger and a second outlet for providing a flow of air to a vent from the system.

In some embodiments, the thermal collection unit comprises a fan for driving a flow of air to a vent outlet or an outlet to the evaporator or first heat exchanger.

In some embodiments, the system comprises modular units.

In some embodiments, the units are adapted to be configured together or separately by interconnecting ducts and communication pipes to provide for flexibility in installation.

In some embodiments, the system comprises a thermal collection unit, a heat exchanger unit, and a heat pump unit.

In some embodiments, the thermal collection unit, the heat exchanger unit, and the heat pump unit are adapted to be arranged with the collection unit mounted on top of the heat exchanger unit, and the heat pump unit located in a side-by-side arrangement with the heat exchanger unit to achieve a compact height configuration.

In some embodiments, the heat exchanger unit comprises the evaporator or first heat exchanger of the heat pump circuit.

In some embodiments, the heat exchanger unit comprises a fan for driving the first flow of air through the unit.

In some embodiments, the heat exchanger unit comprises an inlet valve to select a flow of air to be received from two different sources, e.g. from the thermal collection unit and from an ambient air supply.

In some embodiments, the heat exchanger unit comprises an outlet valve to selectively deliver a flow of air from the unit to two different destinations, e.g. to the living space or to a vent from the building.

In some embodiments, the heat exchanger unit comprises the passive heat exchanger.

In some embodiments, the heat pump unit comprises the compressor and/or the first condenser and/or the second condenser or second heat exchanger.

In some embodiments, the heat pump unit comprises the refrigerant reversing valve.

In some embodiments, the heat pump unit comprises a fan to provide a flow of air through the heat pump unit through the second condenser/second heat exchanger.

In some embodiments, the heat pump unit comprises a water pump to pump water through the water circuit including the first condenser.

In some embodiments, the heat pump unit comprises a valve to selectively direct water to and from the unit to communicate with corresponding water pipes in the heat exchanger unit for communication with the passive heat exchanger.

In some embodiments, further comprising a controller and one or more sensors in communication with the controller, the one or more sensors comprising any one or more of:

a temperature sensor downstream of the heat pump cycle first heat exchanger (e.g. evaporator) to indicate the temperature of air being provided to a living space, a temperature sensor upstream of the first heat exchanger or a passive heat exchanger indicating the temperature of air being received from a solar thermal collection system, a temperature sensor upstream of the first heat exchanger or a passive heat exchanger indicating the temperature of air being returned from a living space or provided from ambient, one or more temperature sensors arranged in the second flow of air, to indicate the temperature of ambient air being provided to the second condenser or second heat exchanger and/or the temperature of the flow of air being exhausted from the second condenser or second heat exchanger one or more temperature sensors in the water circuit to indicate the temperature of the water being provided to and from a water cylinder, a flow rate sensor for indicating the flow rate of the water in the water circuit.

In some embodiments, the system comprises at least two temperature sensors in the water circuit and the controller receives a signal from each said temperature sensor and determines an indication of the thermal energy transferred to the water by the system and provides an output indicative of said thermal energy.

In some embodiments, the controller receives as an input a cost per unit of energy for water heating and determines from the thermal energy transferred to the water by the system a cost saving provided by the system, and the controller providing an output indicative of said cost saving.

In another aspect, the present invention broadly consists in a system for providing air conditioning to a living space and heating potable water comprising:

a heat pump cycle comprising:

an evaporator for transferring heat from the heat pump cycle to a first flow of air to be provided to the living space, and two condensers, a first condenser for transferring heat from the heat pump cycle to potable water, and a second condenser for transferring heat from the heat pump cycle to a second flow of air.

In another aspect, the present invention broadly consists in a system for providing heated air to a living space comprising:
- a heat exchanger adapted to receive a flow of air from an air inlet,
- a water circuit adapted to be connected to a house hold heated water tank,
- a pump for pumping water around the water circuit from the tank through the heat exchanger to be returned to the tank, the heat exchanger transferring heat from the water to the flow of air,
- an air outlet to provide the flow of air heated by passing through the heat exchanger to the living space.

In another aspect, the present invention broadly consists in a system for providing air conditioning to a living space and heating potable water comprising:
- a heat pump circuit comprising a compressor for circulating a refrigerant around the heat pump circuit, a first heat exchanger, a second heat exchanger and a first condenser,
- a first heat exchanger configurable as an evaporator or a second condenser,
- a second heat exchanger configurable as a second condenser or an evaporator, and
- a valve for selecting the direction of flow of refrigerant in the heat pump circuit through the first and second heat exchangers, and wherein the first condenser is located within the heat pump circuit between the compressor and the valve, and
    with the valve in a first position:
        the first heat exchanger configured as the evaporator to receive the first flow of air and transfer heat from the air to the refrigerant, and
        the second heat exchanger configured as a second condenser to receive the second flow of air to transfer heat from the refrigerant to the air, and
    with the valve in a second position:
        the first heat exchanger configured as a second condenser to receive the first flow of air and transfer heat from the refrigerant to the first flow of air, and
        the second heat exchanger configured as an evaporator to receive the second flow of air to transfer heat from the air to the refrigerant,
    the system adapted to provide the first flow of air from the first heat exchanger to the living space to condition the air in the living space, and
    a first condenser adapted to receive a flow of water to transfer heat from the refrigerant to the water when the valve is in the first and second positions.

In some embodiments, the system further comprises a liquid receiver or reservoir configured to add refrigerant to the heat pump circuit or remove refrigerant from the heat pump circuit.

In some embodiments, wherein the liquid receiver or reservoir provides for an additional source of a volume of refrigerant for addition to the heat pump circuit, and provides for storage of a refrigerant removed from the heat pump circuit.

In some embodiments, wherein the liquid receiver or reservoir is configured to add refrigerant to the heat pump circuit when a heating demand on the system increases, is high relative to a predetermined operating condition, or is above a threshold (optionally the liquid receiver or reservoir is configured to add refrigerant to the heat pump circuit when the first condenser is configured to heat said water.)

In some embodiments, wherein the liquid receiver or reservoir is configured to add refrigerant to the heat pump circuit when a heat load on the system decreases, is low relative to a predetermined operating condition, or is below a threshold.

In some embodiments, wherein the liquid receiver or reservoir is configured to remove refrigerant from the heat pump circuit when a heating demand on the system decreases, is low relative to a predetermined operating condition or is below a threshold (optionally the liquid receiver or reservoir is configured to remove refrigerant from the heat pump circuit when the first condenser is not configured to heat said water.)

In some embodiments, the liquid receiver or reservoir is configured to remove refrigerant from the heat pump circuit when a heat load on the system increases, is high relative to a predetermined operating condition or is above a threshold.

In some embodiments, the liquid receiver or reservoir is configured to maintain a substantially constant pressure in the heat pump circuit.

In some embodiments, if the pressure of refrigerant decreases optionally, due to a decrease in heat load or an increase in heat demand, the liquid receiver is configured to add refrigerant to the heat pump circuit to maintain said substantially constant pressure.

In some embodiments, if the pressure of refrigerant increases optionally, due to an increase in heat load or an decrease in heat demand, the liquid receiver is configured to remove refrigerant from the heat pump circuit to maintain said substantially constant pressure.

In some embodiments, the liquid receiver or reservoir is located after the first condenser and the second condenser, and before the evaporator.

In some embodiments, the liquid receiver or reservoir is located between the first heat exchanger and the second heat exchanger in the heat pump circuit (optionally when the valve is in both the first position and the second position).

In some embodiments, the liquid receiver or reservoir is located before an expansion valve in the heat pump circuit.

The second, third and fourth aspects may include any one or more of the features described above in relation to the first aspect.

The term "comprising" as used in this specification and claims means "consisting at least in part of". When interpreting each statement in this specification and claims that includes the term "comprising", features other than that or those prefaced by the term may also be present. Related terms such as "comprise" and "comprises" are to be interpreted in the same manner.

It is intended that reference to a range of numbers disclosed herein (for example, 1 to 10) also incorporates reference to all rational numbers within that range (for example, 1, 1.1, 2, 3, 3.9, 4, 5, 6, 6.5, 7, 8, 9 and 10) and also any range of rational numbers within that range (for example, 2 to 8, 1.5 to 5.5 and 3.1 to 4.7) and, therefore, all sub-ranges of all ranges expressly disclosed herein are hereby expressly disclosed. These are only examples of what is specifically intended and all possible combinations of numerical values between the lowest value and the highest value enumerated are to be considered to be expressly stated in this application in a similar manner.

As used herein the term "and/or" means "and" or "or", or both.

As used herein "(s)" following a noun means the plural and/or singular forms of the noun.

This invention may also be said broadly to consist in the parts, elements and features referred to or indicated in the specification of the application, individually or collectively, and any or all combinations of any two or more said parts, elements or features, and where specific integers are mentioned herein which have known equivalents in the art to which this invention relates, such known equivalents are deemed to be incorporated herein as if individually set forth.

The invention consists in the foregoing and also envisages constructions of which the following gives examples only.

BRIEF DESCRIPTION OF THE DRAWINGS

Preferred embodiments of the invention will be described by way of example only and with reference to the drawings, in which:

FIGS. 12 and 13 present data for a winter's day.

FIG. 14 presents data for a summer's day.

DETAILED DESCRIPTION OF PREFERRED EMBODIMENTS

Figure 1:
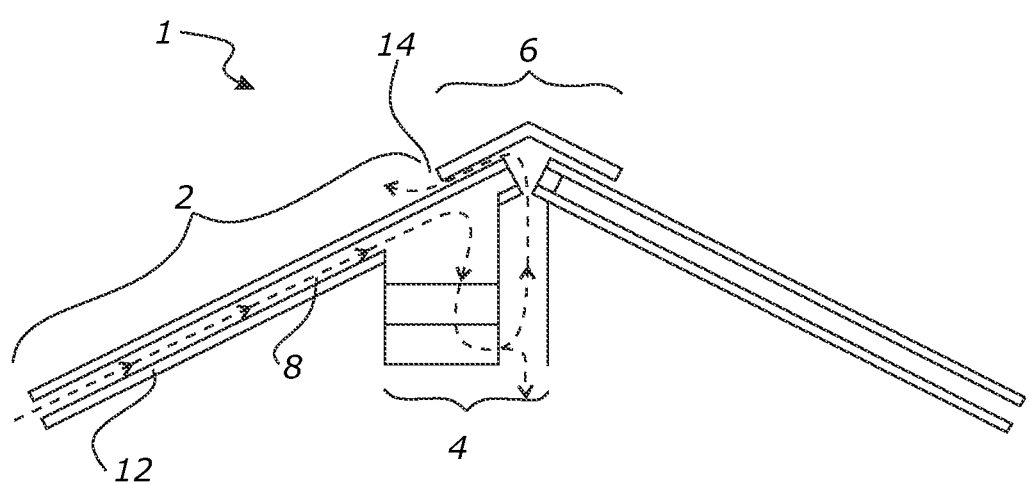
FIG. 1 is a schematic representation of a solar thermal collection system and a thermal collection unit.

Various embodiments are described with reference to the Figures. Throughout the Figures and specification, the same reference numerals may be used to designate the same or similar components, and redundant descriptions thereof may be omitted.

Figure 2:
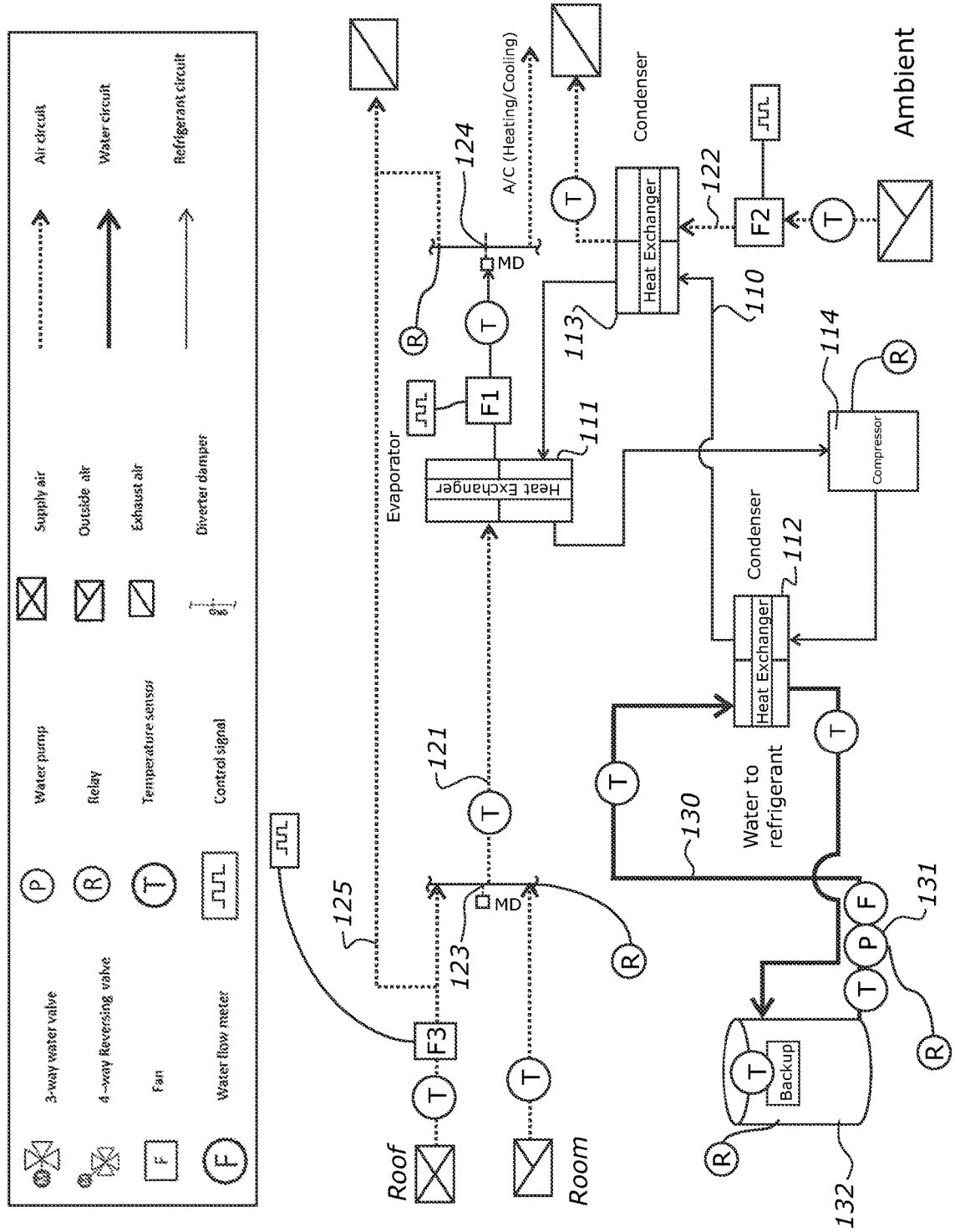
FIG. 2 is a schematic of a system for providing air conditioning to a living space and heating potable water.
Figure 3:
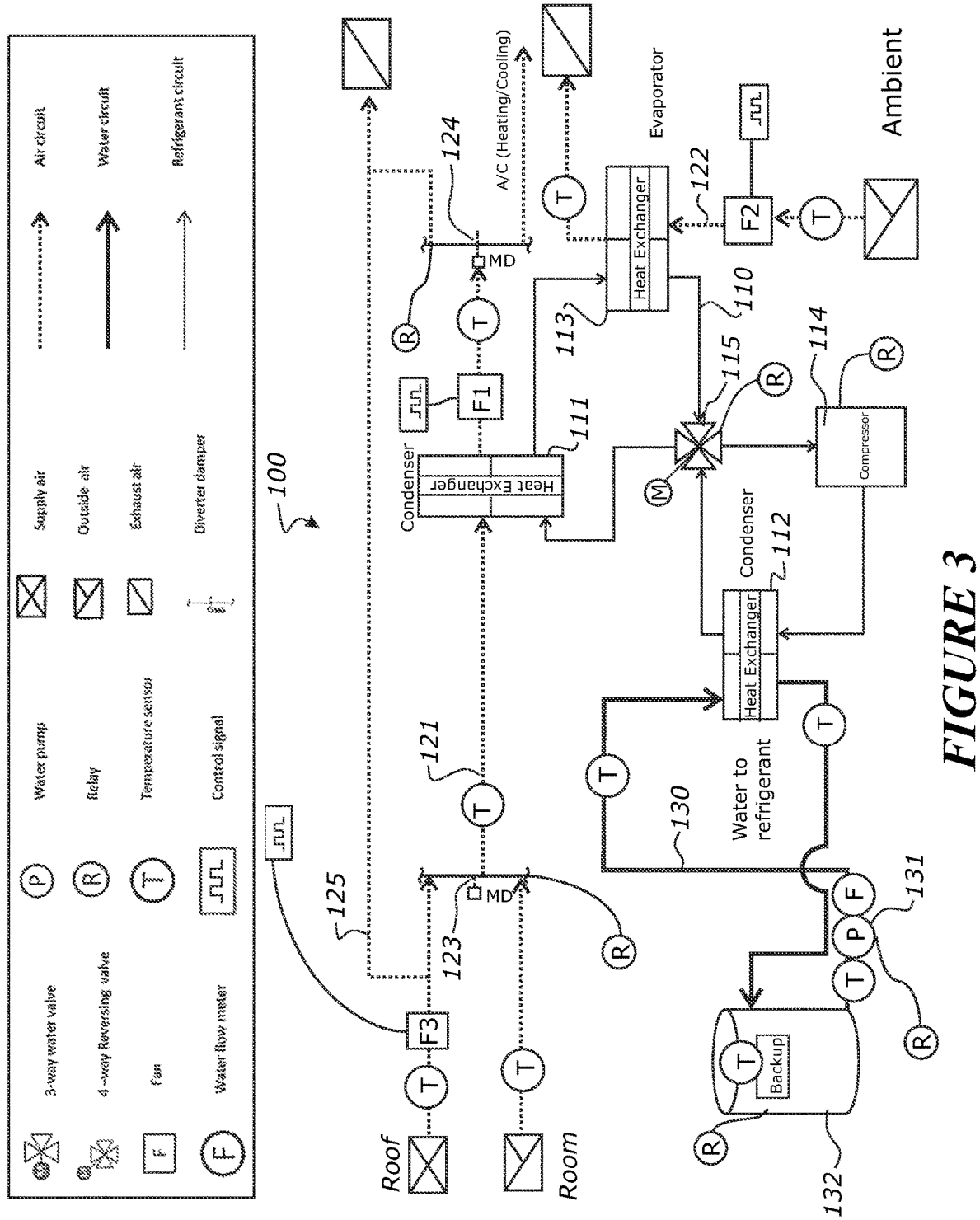
FIG. 3 is a schematic of another system for providing air conditioning to a living space and heating potable water.
Figure 4A:
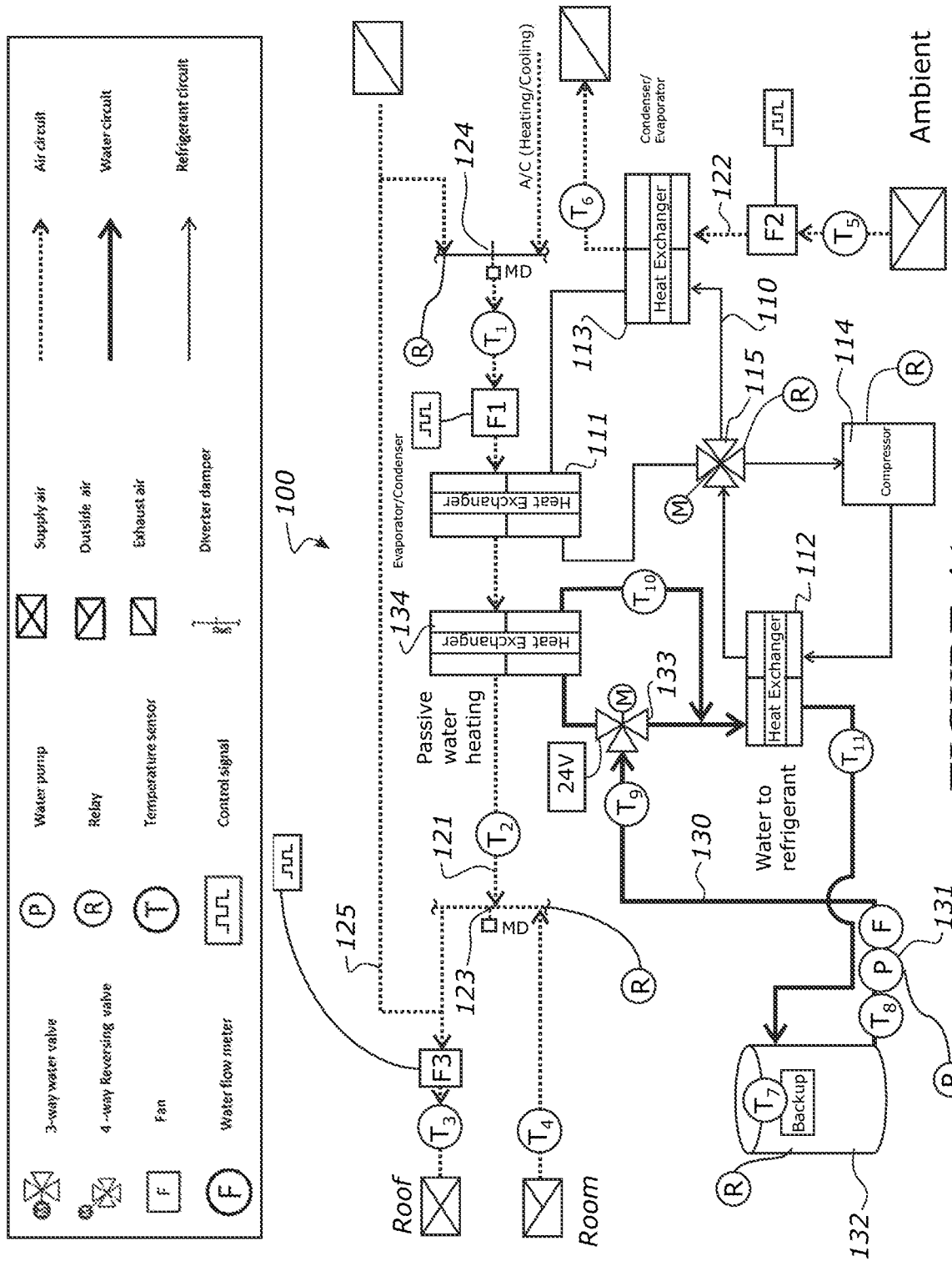
FIG. 4A is the schematic of the system of FIG. 4 but operating to reverse a direction of flow of air through the system in a snow melting mode.
Figure 4B:
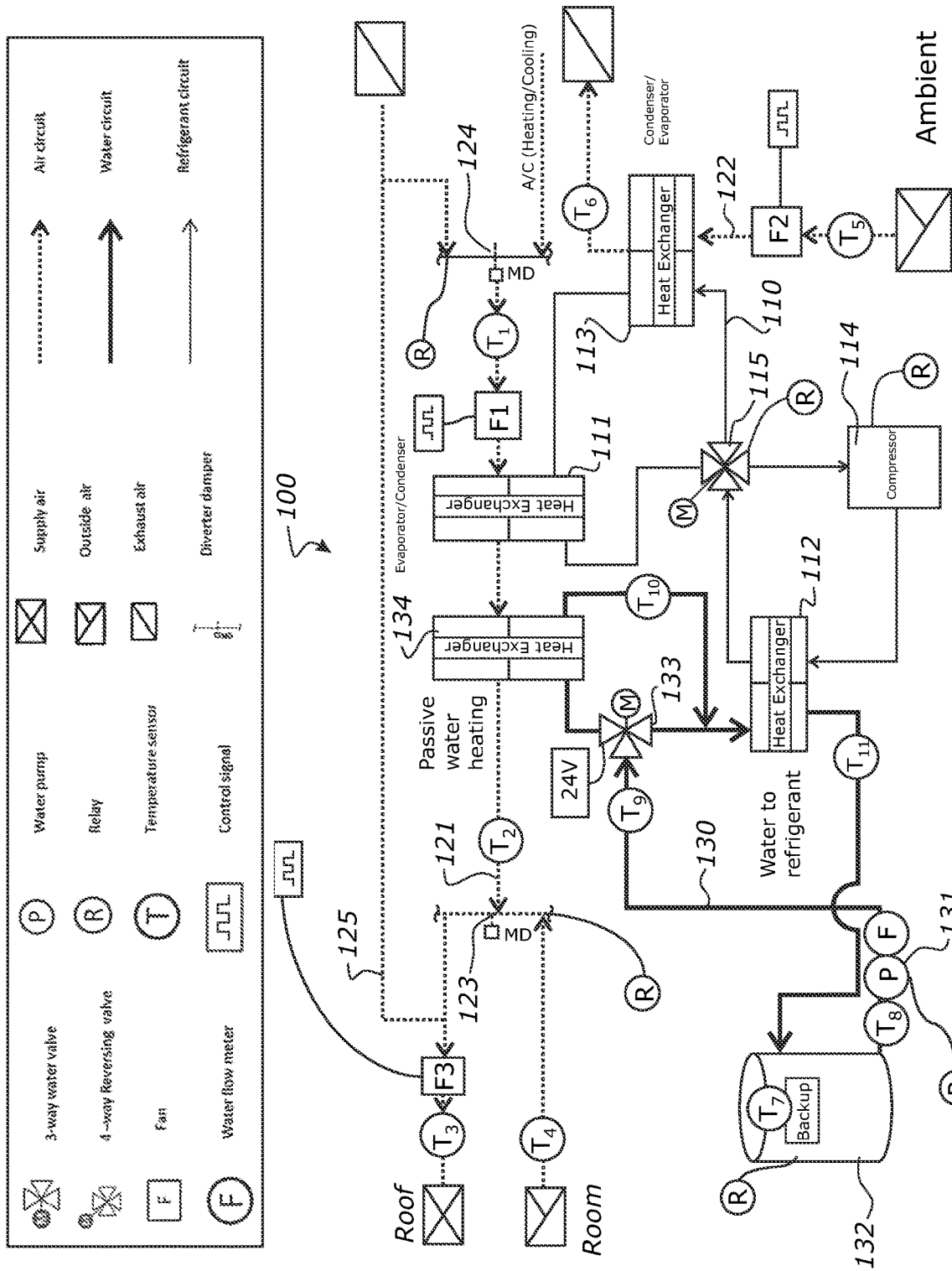
FIG. 4 is a schematic of another system for providing air conditioning to a living space and heating potable water.

FIGS. 2 to 4 provide schematics of a system or systems 100 for heating potable water and providing conditioning air (selectively heating and cooling) to a living space in a building. In some embodiments, as illustrated, the system comprises both 'passive' heating being heating provided by collection of solar thermal energy, and 'active' heating being heating provided by a further heat source such as a heat pump powered by an electrical supply (e.g. house hold electrical supply). In some embodiments the system may comprise only active heating, however a preferred system includes both passive and active heating.

A system according to the present invention comprises a refrigeration or heat pump cycle or circuit 110 comprising an evaporator 111, a first condenser 112, a second condenser 113 and a compressor 114. The evaporator 111 receives a flow of air 121 (a first flow of air), e.g. air heated by a passive heat source, for example a flow of air received from a roof cavity heated by solar energy described with reference to FIG. 1. The flow of air 121 is generated by a fan F1, or in some embodiments additionally a fan F3 where provided and as required for a large solar collection area. The evaporator 111 transfers heat from the air to a refrigerant in the heat pump cycle 110 as the refrigerant evaporates. The refrigerant gas provided by the evaporator 111 is received by the compressor 114 and then the first condenser 112. The first condenser 112 receives the compressed hot refrigerant gas and potable water in a potable water circuit 130 and transfers heat from the refrigerant to the potable water to heat the potable water. The potable water circuit 130 comprises a pump 131 to circulate the water around the circuit through the condenser and to and from a storage tank or cylinder 132 of a household water system.

The refrigerant passes from the first condenser 112 to the second condenser 113. The second condenser 113 receives a flow air 122 (a second flow of air), e.g. a flow of ambient air from outside of a building, and transfers heat from the refrigerant to the flow of air 122. The flow of ambient air 122 is driven by a fan F2. The heated ambient air is exhausted from the second condenser 113 to ambient, for example via a vent opening from the roof of a building.

The refrigerant passes from the second condenser 113 to the evaporator 111 to complete the heat pump cycle.

As described above with reference to FIG. 2, a system 100 according to some embodiments of the present invention comprises a heat pump cycle 110 comprising two condensers, a first condenser 112 for transferring heat from the heat pump cycle to potable water, and a second condenser 113 for transferring heat from the heat pump cycle to air. This system provides a benefit whereby 'free' energy provided from the heat pump cycle 110 and/or a solar thermal energy collection system 1 is used to heat potable water for use in a household, and in some embodiments as described below to heat air to be provided to a living space for air conditioning (air heating). However, additional capacity for cooling and condensing of the refrigerant in the heat pump cycle 110 provided by the second condenser 113 allows for cool air conditioning to be provided even when the temperature of the potable water reaches a maximum temperature. Once the potable water has reached a maximum temperature, the heat pump cycle 110 may continue to run by transferring heat in the second condenser 113 to the second flow of air.

Air cooled by the evaporator 111 may be provided to a living space for cooling the air temperature within the living space, or alternatively may be selectively vented to ambient, e.g. via a vent opening in a roof ridge. Even when potable water has been fully heated, the system can continue to provide an air conditioning function. Once the water has been fully heated a water pump 131 in the water circuit 130 is turned off to stop water circulating through the first condenser 112 so that heat is no longer provided to the water held in the cylinder. A valve in the water circuit (not shown)

may also be closed to prevent water circulating in the water circuit by convection. Further cooling may be provided by circulating air from the living space through the evaporator 111. The system 100 may comprise a valve 123 to direct living space air through the evaporator 111 rather than air from a solar thermal heating system. Air from the solar thermal heating system 1 may be selectively diverted by a valve (not shown in the Figures) to bypass the evaporator 111 and be vented to ambient via a vent opening, e.g. in a vented ridge of a roof as described previously. A bypass 125 may be provided to selectively transfer the solar thermal heated air from the roof cavity and collection unit directly to a vent to ambient via a valve (not shown). A fan F3 may be provided to drive air flow through the bypass. The bypass may include a fan (e.g. position fan F3 in the bypass 125) and the bypass may be actuated by energizing the bypass fan and/or operating a valve.

Where warm or heated air is required to be provided to the living space, the heat pump compressor 114 may be turned off to stop the refrigerant circulating through the evaporator so that solar heated air may be provided without cooling to the living space. In this configuration the solar thermally heated air is passed through the evaporator 111 without significant heat transfer from the solar heated air.

In some embodiments, and as shown in FIG. 3, the system 100 may comprise a reversing valve in the heat pump circuit. The first condenser 112 is provided in the heat pump circuit 110 between the compressor 114 and the reversing valve 115. The reversing valve 115 changes the direction of circulation of the refrigerant such that the function of the refrigerant-to-air heat exchangers 111, 113 is switched from evaporator to condenser to condenser to evaporator. As shown in FIG. 2, the heat exchanger 111 (the first heat exchanger) receiving air from a solar thermal heating system is an evaporator and the heat exchanger 113 (the second heat exchanger) receiving a flow of ambient air is the second condenser. However, by switching the reversing valve 115 to change the direction of circulation of refrigerant, as shown in FIG. 3, the first heat exchanger 111 receiving air from a solar thermal heating system is configured as the second condenser and the second heat exchanger 113 receiving a flow of ambient air is configured as the heat pump circuit evaporator. By locating the first condenser 112 in the heat pump circuit 110 after the compressor 114 and before the reversing valve 115 means that the direction that the refrigerant circulates through the first condenser 112 does not change so that regardless of the position of the reversing valve 115 the system remains configured to heat the potable water via the first condenser 112. The first and second heat exchangers 111, 113 (the evaporators/second condensers) are in series in the heat pump circuit 110.

In the configuration shown in FIG. 3, heating may be provided to the living space by the passive heating provided by the solar system and where further heat is required the solar heating may be supplemented by the heat pump circuit when the refrigeration valve 115 is switched so that the heat exchanger 1 is operating as a condenser. Where water heating is also required, the heat pump may run with or without thermal energy being provided by passive heating. In this specification, unless the context suggests otherwise, passive heating means providing heat without running the heat pump compressor. Other system components may be active in passive heating, for example, the fan F1 and the water pump 131.

Figure 3A:
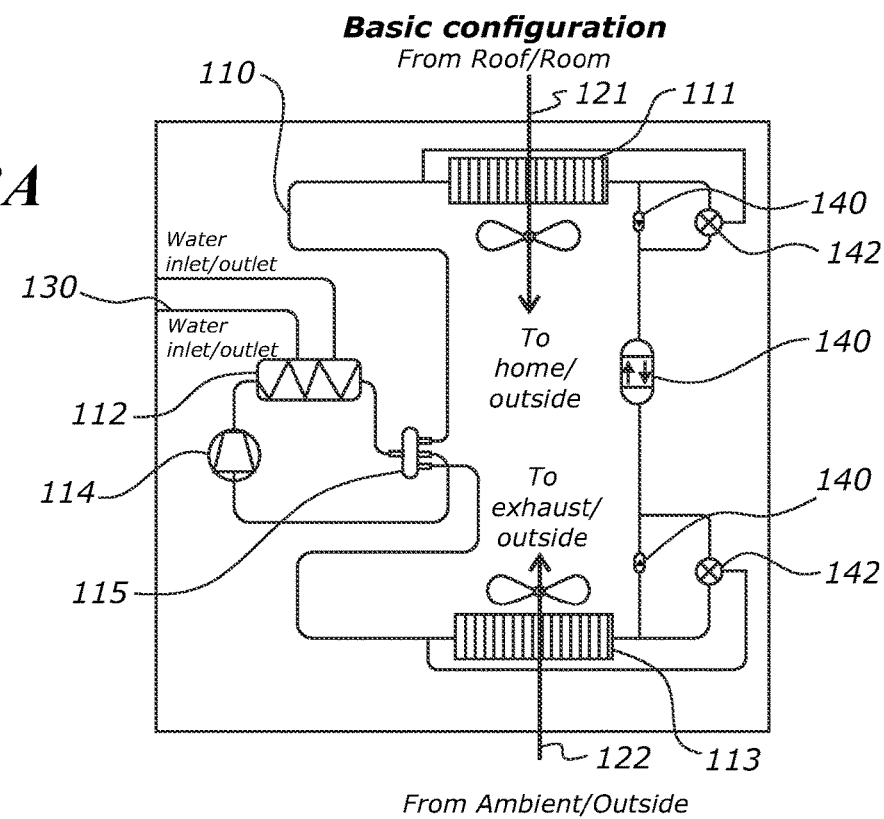
FIG. 3A is a schematic representation of a heat pump circuit of a system providing heating and cooling of air and heating potable water.
Figure 3B:
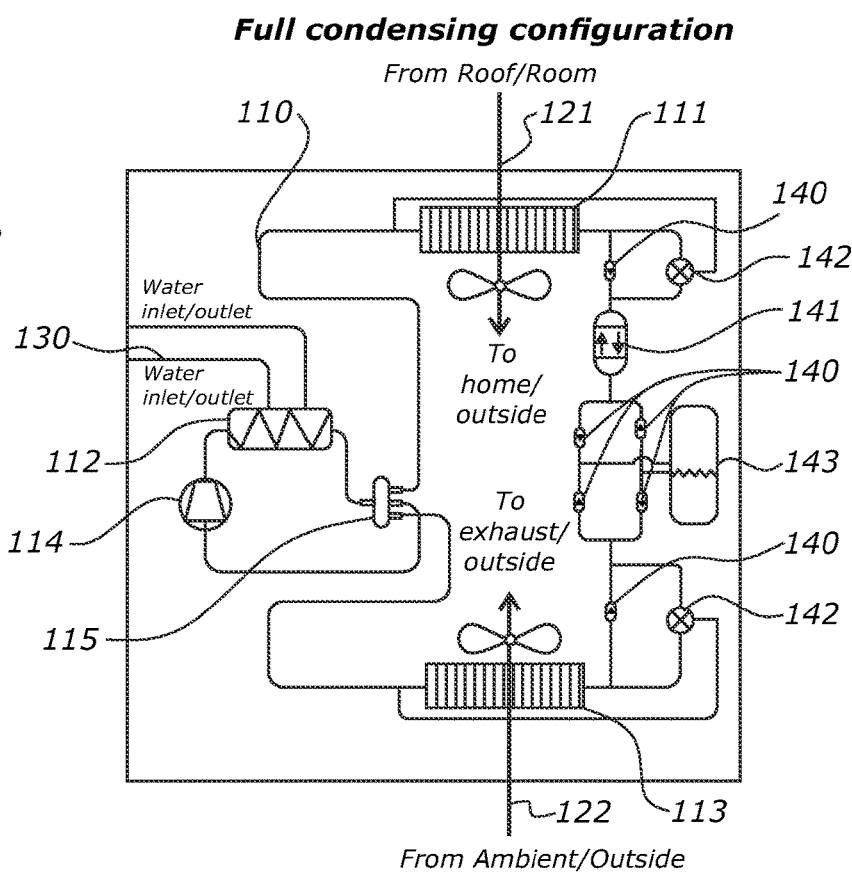
FIGS. 3B and 3C are schematic representations of heat pump circuits of a system providing heating and cooling of air and heating potable water containing a liquid receiver or reservoir.
Figure 3C:
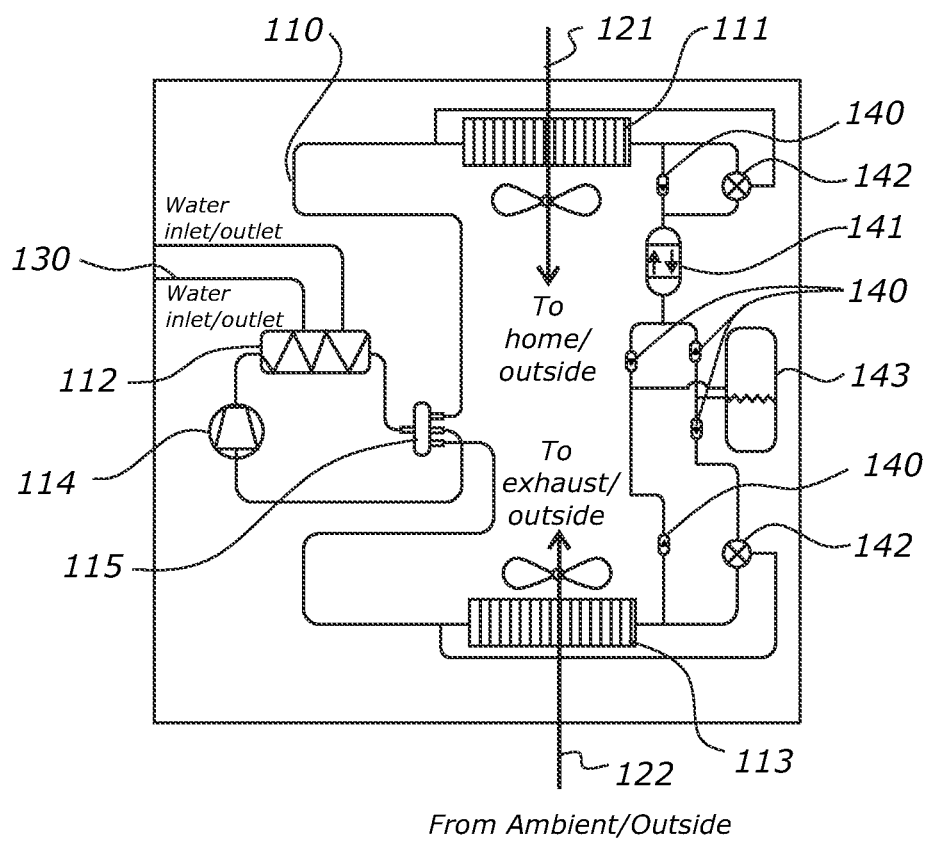

FIGS. 3A-3C show various embodiments of the heat pump circuit 110, and water circuit 130. When the water pump is activated the first condenser 112 receives a flow of water from the water circuit 130 and transfers heat from the refrigerant to the water. When the water pump is inactive no flow of water is provided to the first condenser 112, and so the water is not heated. The first heat exchanger 111 is receivable of the first flow of air 121 and may be configurable as either an evaporator, or second condenser depending on the state of the valve 115. The second heat exchanger 113 is receivable of the second flow of air 122 and may be configurable as either an evaporator, or second condenser depending on the state of the valve 115.

In a first state or first position of the valve 115 the refrigerant circulates in a direction from the second heat exchanger 113 to the first heat exchanger 111 through the heat pump circuit 110 and the second heat exchanger 113 is configured to act as a second condenser to transfer heat from the refrigerant to the second flow of air 122, while the first heat exchanger 111 is configured to act as an evaporator to transfer heat from the first flow of air 121 to the refrigerant.

In a second state or second position of the valve 115 the refrigerant circulates in a direction from the first heat exchanger 111 to the second heat exchanger 113 through the heat pump circuit 110 and the first heat exchanger 111 is configured to act as a second condenser to transfer heat from the refrigerant to the first flow of air 121, while the second heat exchanger 113 is configured to act as an evaporator to transfer heat from the second flow of air 121 to the refrigerant.

The first condenser 112 is part of the heat pump circuit in both configurations of first state or first position of the valve 115 and the second state or second position of the valve 115.

The heat pump circuit 110 may also comprise one or more check valves 140. The check valves are located around the heat pump circuit 110 to prevent flow of refrigerant in the incorrect direction through the heat pump circuit 110. The heat pump circuit may also comprise a filter-drier 141. The filter-drier 141 is configured to remove moisture, any foreign particles or material or any air from the heat pump circuit 141. The filter-drier 141 may work in both directions (as show in FIGS. 3A-3C) so that in both states or positions of the valve 115 the filter-drier may function correctly.

The heat pump circuit 110 may also comprise one or more expansion valves 142. The expansion valves 142 may be located adjacent each of the first heat exchanger 111 and the second heat exchanger 113. The expansion valve A check valve 140 may be provided in parallel with each expansion valve 142 to allow for the expansion valve to be bypassed. For example the heat pump circuit 100 in FIGS. 3B and 3C has two expansion valves 142 each provided with a check valve 140 in parallel. The expansion valves 142 provided in parallel with a check valve 142 allows each of the expansion valves 142 is to be utilized in for each state of the valve or direction or refrigerant flow.

In some embodiments the heat pump circuit 110 may comprise a liquid receiver or reservoir 143 for example as shown in the configurations of FIGS. 3B and 3C. The liquid receiver or reservoir 143 may provide for an additional source of a volume of refrigerant for addition to the heat pump circuit 110, and/or provide for storage of a refrigerant removed from the heat pump circuit 110. The liquid receiver or reservoir 143 may retain the excess of refrigerant in gas form that is not condensed after the refrigerant passes through the first and second condensers.

The liquid receiver or reservoir 143 may be configured to add refrigerant to and/or remove refrigerant from the heat pump circuit 110. The liquid receiver or reservoir 143 may be configured to add refrigerant to and/or remove refrigerant from the heat pump circuit 110 based on a heating demand on the system, or a heat load or other conditions of the system.

The heating demand on the system may be based on amount of heat required to be provided by the system. This may comprise the heat to be provided in air heating, and/or the temperature of the water to be heated, and/or the configuration or mode of the system for example if the first condenser 112 is configured to heat water—i.e. if both the first condenser and second condenser are active in a double condensing circuit.

The heating demand may be considered relatively high if the amount of heat required to be provided in air heating is relatively high, the temperature of the water to be heated is relatively low or below a threshold, if the system is in a particular mode, and/or if the system is configured to heat water. The heating demand may be considered relatively low if air cooling is required, the temperature of the water to be heated is relatively high or above a threshold, if the system is in a particular mode, and/or if the system is configured to such that water heating is not required.

The heat load on the system may be based on the ambient conditions of the system. The heat load may be based on the temperature of the ambient air. The heat load on the system may be relatively high if the ambient air temperature is relatively high or above a threshold. The heat load on the system may be considered relatively low if the ambient air temperature is relatively low or below a threshold.

The liquid receiver or reservoir 143 may be configured to maintain a constant pressure in the heat pump circuit 110. If the pressure of refrigerant decreases due to a decrease in heat load or an increase in heat demand the liquid receiver may be configured to add refrigerant to the heat pump circuit 110 to maintain said constant pressure. Conversely, if the pressure of refrigerant increases due to an increase in heat load or an decrease in heat demand the liquid receiver may be configured to remove refrigerant from the heat pump circuit 110 to maintain a constant pressure.

The liquid receiver or reservoir 143 may be configured to remove excess refrigerant from the heat pump circuit 110 when the heating demand on the system decreases, is low (optionally relative to a predetermined operating condition), or is below a threshold. Alternatively, or additionally the liquid receiver or reservoir 143 may be configured to remove excess refrigerant when the heat load on the system increases, is high (optionally relative to a predetermined operating condition), or is above a threshold.

Additionally or alternatively, the liquid receiver or reservoir 143 may be configured to add refrigerant to the heat pump circuit 110 when the heating demand on the system increases, is high (optionally relative to a predetermined operating condition), or is above a threshold. Alternatively, or additionally the liquid receiver or reservoir 143 may be configured to add refrigerant to the heat pump circuit 110 when the heat load on the system decreases, is low (optionally relative to a predetermined operating condition), or is below a threshold.

A predetermined operating condition may be a condition or conditions for which the heat pump circuit 110 or system is configured for operation as a default setting, or may be an initial set of operating conditions for which the heat pump circuit or system are configured to be operationally efficient or more commonly operate within. Where refrigerant is added to the heat pump circuit or system, or where refrigerant is removed from the heat pump circuit or system, such a determination may be made by a controller which is used to sense or detect particular parameters of the circuit or system for evaluation of the load being placed upon the circuit or system.

As shown in FIGS. 3B and 3C the liquid receiver or reservoir is located after the first condenser and the second condenser i.e. at the end of the double condensing circuit. The liquid receiver or reservoir 143 is located between the first heat exchanger 111 and the second heat exchanger 113 to add or remove refrigerant from the heat pump circuit 110. Having the liquid receiver or reservoir 143 located between the first heat exchanger 111 and the second heat exchanger 113 configuration is useful as regardless of the state of the reversing valve 115 (and the particular configuration of the first and second heat exchangers as either the evaporator or second condenser) the liquid receiver or reservoir 143 is located after the first condenser and second condenser. Any excess refrigerant in the heat pump circuit 110 after the first condenser and second condenser can be removed, and further if more refrigerant is required in the heat pump circuit 110 more refrigerant can be added. The liquid receiver or reservoir 143 may also be located in the heat pump circuit 110 before the expansion valve(s) 142. For example two expansion valves 142 are shown in FIGS. 3B and 3C.

In some embodiments the liquid receiver or reservoir 143 is configured to remove or add refrigerant internally as is known in the art. Alternatively or additionally a controller (for example that as described above, or a separate controller) may be configured to control the addition or removal of refrigerant depending on the mode or conditions of the system.

In some embodiments, the system 100 comprises a heat exchanger 134 for transferring heat between the water circuit 130 and the air flow 121 to be provided to a living space, as shown in FIG. 4. The potable water storage tank 132 may comprise a heating source, for example an electrical element or heated by a fuel such as a gas e.g. LPG or natural gas. The heating source may be energized to heat the water in the tank 132. The potable water circuit 130 may comprise a valve 133 to switch the heat exchanger 134 (for ease of reference, the 'passive' heat exchanger) into and out of the water circuit 130. In one configuration the valve 133 is switched to bypass the heat exchanger 134 so that the potable water is pumped from the tank 132 and through the first compressor 112 of the heat pump circuit 110 and back to the tank 132. In another configuration the valve 133 may be switched so that the heat exchanger 134 is in the circuit 130. The water is pumped from the tank 132 and through the heat exchanger 134, the first compressor 112 of the heat pump circuit 110 and back to the tank 132.

Figure 8:
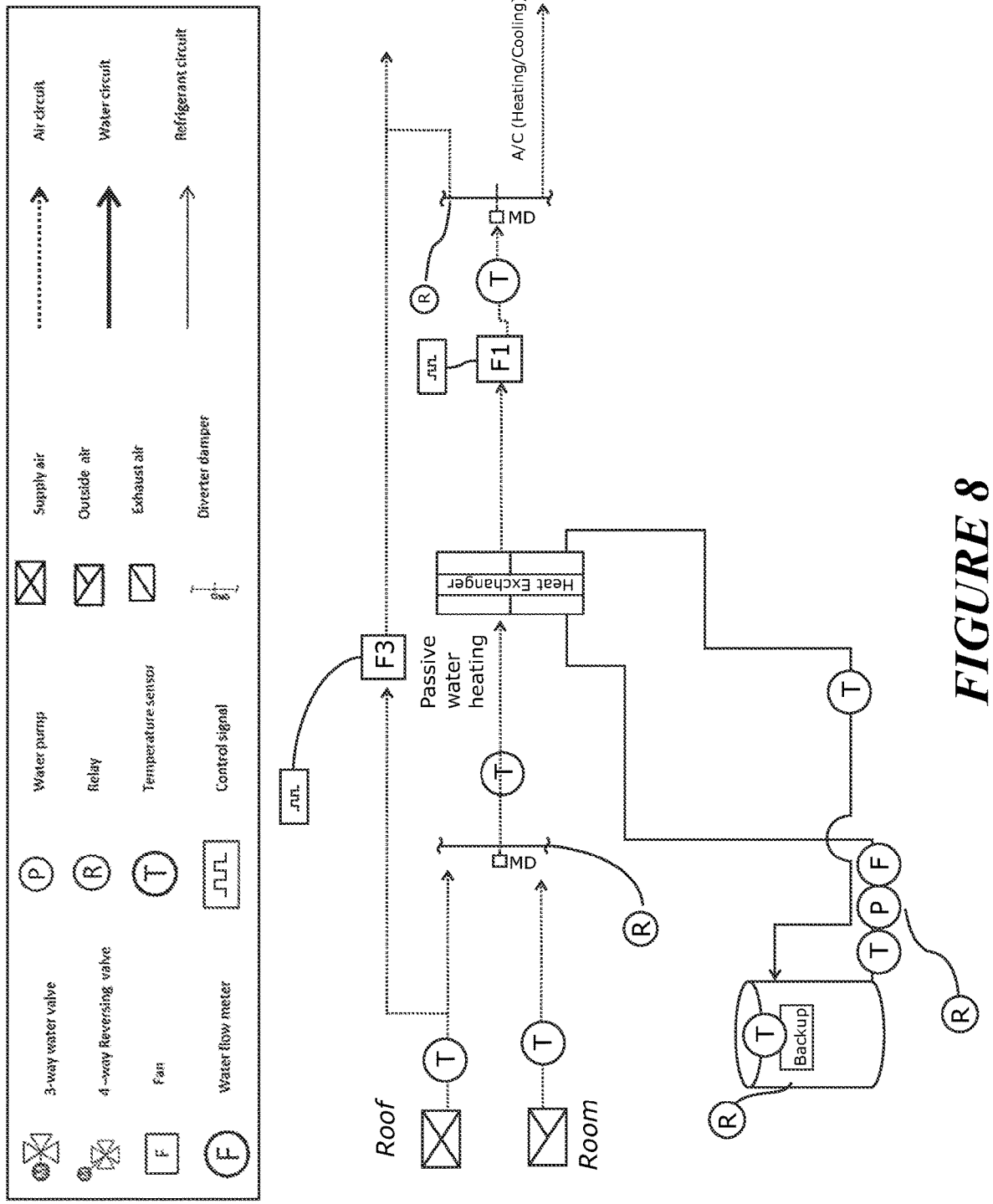
FIG. 8 is a schematic of a system for providing a flow of heated air to a living space. The air is heated by hot water from a house hold heated water tank.

Additional heat may be provided to the air 121 to be provided to a living space by heating the water in the tank 132 using the heating source (e.g. electrical element) and pumping the water and air through the heat exchanger 134 to transfer heat from the hot water to the air, for heating the living space. In some embodiments, the water circuit may be configured to only provide heat to the air flow to be provided to the living space, as illustrated in FIG. 8.

In some embodiments, where the temperature of the flow of air 121 provided from the solar thermal collection system is sufficiently high, the passive heat exchanger 134 may be used to transfer heat from the air 121 to the water to heat water in the water tank 130. In some configurations, the passive heat exchanger 134 may be used to transfer heat from the air to 'boost' heating of the water in addition to 'active' heating provided by the first condenser 112 of the heat pump circuit 110.

In some embodiments the heat exchanger 134 and first condenser 112 are arranged in series within the potable water circuit 130. The water circuit heat exchanger 134 and the first heat exchanger 111 of the heat pump circuit 110 may be arranged in the first flow of air 121 in series, the first flow of air 121 passing through the water circuit heat exchanger 134 and the heat pump circuit first heat exchanger 111. In some embodiments the passive heat exchanger 134 is in the air flow 121 upstream of the heat pump heat exchanger 111 so that the hot air from the solar collection system passes through the passive heat exchanger first to provide a maximum thermal gradient from the air to the passive heat exchanger. Whether the heat exchangers transfer heat to or from the first air flow 121 is dependent on whether the water or refrigerant is circulated through the respective heat exchanger. The reversing valve 115 configures the heat pump cycle 110 as either a heat pump cycle or a refrigeration cycle in relation to the first flow of gases 121 to be provided to the living space.

In a preferred embodiment the system 100 comprises a controller or control system, and in some embodiments a human interface to allow a user to provide inputs to the control system. The system may comprise a number of sensors, for example temperature and flow rate sensors.

In some embodiments the system comprises one or more temperature sensors arranged in the first flow of air. For example, as shown in FIG. 4, the system may comprise a temperature sensor T1 downstream of the heat pump cycle first heat exchanger 111, to indicate the temperature of air being provided to the living space, and/or a temperature sensor T2, T3 indicating the temperature of air being received from the solar thermal collection system, and/or a temperature sensor T4 indicating the temperature of air being returned from the living space. In some embodiments the system may also comprise a further supply of ambient air to be selectable as the first flow of air (not shown in FIG. 4) and including a temperature sensor indicating the temperature of the incoming ambient air. Depending on a target living space temperature (for example a user selectable temperature) the system may operate a valve to receive flow from one or more of the solar thermal collection system, return air form the living space, or ambient air to the first heat exchanger 111. For example, if the air from the solar thermal collection system is too hot to achieve a desired cooler temperature in the living space, the system may operate a valve to stop air flow from the solar thermal collection system 1 and provide ambient air or air returned from the living space to the first heat exchanger 111. Where air provided from the solar thermal collection system 1 is too hot, the system may vent this air via a roof vent outlet. A flow rate sensor may be provided in the first flow of air (not shown in FIG. 4). The system may control the fan F1 to achieve a desired flow rate of air, for example to increase the flow of air to achieve a desired living space temperature quickly when the temperature of the first flow of air 121 downstream of the heat pump circuit first heat exchanger 111 is sufficiently low or high.

In some embodiments, the system 100 may comprise one or more temperature sensors arranged in the second flow of air 122, for example a sensor T5 to indicate the temperature of ambient air being provided to the system, and a sensor T6 to indicate the flow of air being exhausted from the heat pump circuit second heat exchanger. Output from the sensors may be used to control the fan F2 speed to achieve a desired flow to achieve a desired heat transfer rate between the air and the refrigerant. The system may comprise a flow rate sensor arranged in the second flow of air, for example for use in a feedback control loop for fan speed control.

The water circuit may comprise one or more temperature sensors. The water circuit may comprise one or more flow rate sensors. For example, the system may comprise a temperature sensor to indicate the temperature of water stored in the water tank, e.g. a sensor T7 to indicate the temperature at the top of the water tank and/or a sensor T8 to indicate the temperature at bottom of the water tank, a sensor T9 to indicate the temperature of water supplied to the bypass valve 133, and/or a sensor T10 to indicate the temperature of water exiting the passive heat exchanger, and/or a sensor T11 to indicate the temperature of water exiting the heat pump circuit first condenser 112. The pump 131 may be controlled based on the flow rate sensor F and/or one or more temperature sensors, for example dependent on the temperature from the heat pump circuit first condenser indicative of a rate of heat transfer from the heat pump circuit to the water. Data from temperature sensors and flow rate sensors may be used to determine information useful for calculating energy converted into hot water. For example, the temperature of the water provided to and from the water cylinder by the system 100 and the flow rate of water in the water circuit 130 may be used to calculate the thermal energy provided by the system to the water cylinder 132. This data could also be used to calculate power cost savings provided by the system 100. This information may be useful for energy billing purposes, for example if the home owner does not own the system 100. As described previously, the water tank 132 may include a heat source, e.g. an electric element. The system may be adapted to control the element, for example when in a mode to use the water to heat the first flow of air via the passive heat exchanger, based on data from the sensors.

In some embodiments the system may comprise a number of user selectable modes. The table below provide a number of example modes. Each mode in the table is described below.

| Mode | Inlet valve (air source for first flow of air) | Compressor | Water pump | Fan 1 (1$^{st}$ flow of air) | Fan 2 (2$^{nd}$ flow of air) | Bypass water valve | Refrigeration valve | Outlet valve (1$^{st}$ flow of air) |
|---|---|---|---|---|---|---|---|---|
| Roof cooling only | Roof | 0 | 0 | 1 | 0 | — | — | Vent |
| Passive water heating only | Roof | 0 | 1 | 1 | 0 | 1 | — | Vent |
| Passive water and air heating | Roof | 0 | 1 | 1 | 0 | 1 | — | Room |
| Economy heating | Room | 0 | 1 | 1 | 0 | 1 | — | Room |
| Passive air heating/cooling | Roof | 0 | 0 | 1 | 0 | — | — | Room |
| Active air cooling | Room | 1 | 0 | 1 | 1 | — | 0 | Room |
| Active air heating | Room | 1 | 0 | 1 | 1 | — | 1 | Room |

-continued

| Mode | Inlet valve (air source for first flow of air) | Compressor | Water pump | Fan 1 (1$^{st}$ flow of air) | Fan 2 (2$^{nd}$ flow of air) | Bypass water valve | Refrigeration valve | Outlet valve (1$^{st}$ flow of air) |
|---|---|---|---|---|---|---|---|---|
| Active water and air heating | Room | 1 | 1 | 1 | 1 | 0 | 1 | Room |
| Active water heating and air cooling (A/C priority) | Room | 1 | 1 | 1 | 1 | 0 | 0 | Room |
| Active water heating and air cooling (WH priority) | Roof | 1 | 1 | 1 | 0 | 0 | 0 | Room |
| Water heating boost with A/C | Roof | 1 | 1 | 1 | 0 | 1 | 0 | Room |
| Water heating boost | Roof | 1 | 1 | 1 | 0 | 1 | 0 | Vent |
| Active water heating only | Roof | 1 | 1 | 1 | 0 | 0 | 0 | Vent |
| Water heating from ambient | — | 1 | 1 | 0 | 1 | 0 | 1 | — |

In a roof cooling mode, the system is configured to remove hot air from the roof cavity of the solar thermal collection system. Removing hot air from the cavity can have a cooling effect on the building since thermal energy received by the roof is removed to ambient rather than being radiated to a roof space and/or to a living space below the roof. In the roof cooling only mode, the inlet valve 123 is set to direct air from the roof cavity through the system, and the outlet valve 124 is set to exhaust the first flow of air via a vent to ambient, e.g. via a roof vent opening. The first air flow fan F1 is on and the compressor 114, water pump 131 and second air flow fan F2 are turned off. The position of the water valve 133 and refrigeration valve 115 is irrelevant and so do not need to be switched from a previous state. Alternatively the system heat exchangers could be bypassed, e.g. by operating a fan F3 in a bypass 125 to vent the roof cavity air to ambient.

In a passive water heating (PWH) only mode, the water pump 131 is energized to pump water around the water circuit 130. The water bypass valve 133 is set to divert water through the passive heat exchanger 134 (indicated by '1' in the table). Heated air from the solar thermal collection system is provided through the passive heat exchanger 134 by the first air flow fan F1 to heat the water, and then is vented to ambient via the outlet valve 124. The compressor 114 and second air flow fan F2 are off. The position of the refrigeration valve 115 is irrelevant.

A system according to the present invention was trialed to verify the performance of the system to passively heat water using 50 Degree Celsius air provided to the passive heat exchanger 134. The passive heat exchanger comprised a stack of four layers or rows each comprising a length of ½" copper tube arranged in a zig zag pattern to cover an area of about 12" by 18", including fins attached between the zig-zagged tubing within each layer. For an airflow of 1200 m3/hr and water flow of 6 L/min the passive heat exchanger had a thermal capacity of about 4 kW. In the trial, the passive heat exchanger provided 1 kW of thermal power to the water and the system 100 consumed approximately 0.15 kW of power for operating the fan F1 to drive the flow of air (at an air flow rate of about 250 m3/hour) and the water pump 131 to circular the water (at a water flow rate of about 2.5 L/min) through the water circuit 130 to and from the house water cylinder.

Figure 9:
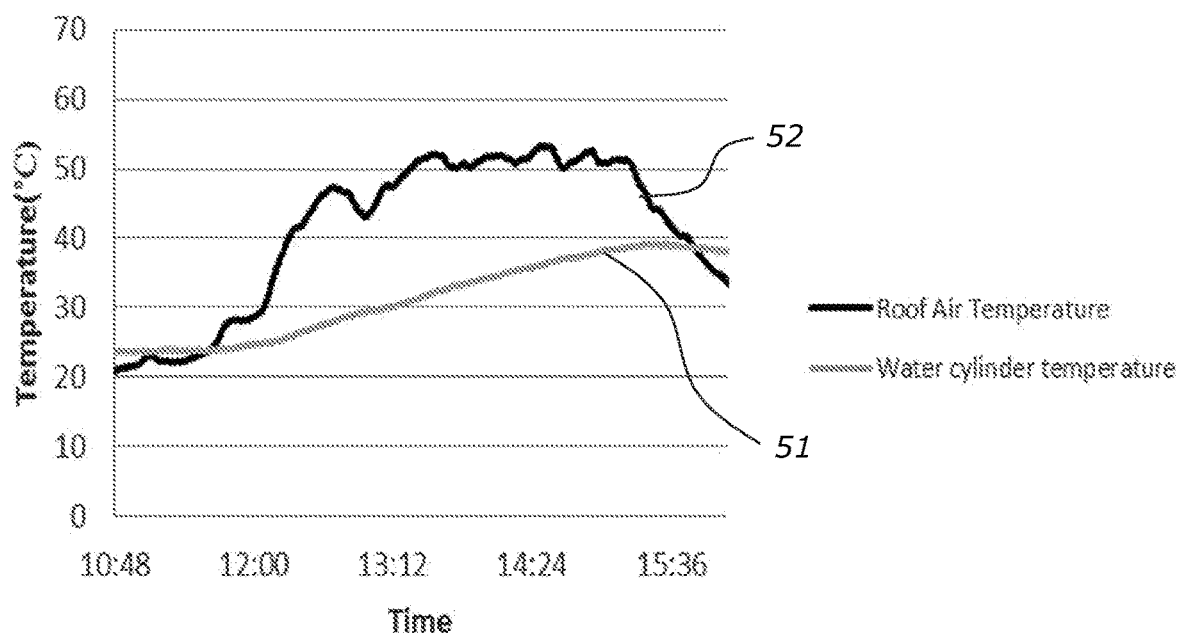
FIG. 9 is a chart illustrating the air supply temperature and water temperature in a passive water heating mode.

A chart of temperature vs time for the heating of the water in the water cylinder 132 using the passive heat exchanger 134 only is shown in FIG. 9. Line 51 indicates the temperature of the air provided to the heat exchanger 134 and line 52 indicates the water temperature in the cylinder. The cylinder contained 200 L of water and was heated from around 24 degrees Celsius to 40 degrees Celsius in about 3 hours using an air flow rate of about 350 m3/hour.

Figure 15:
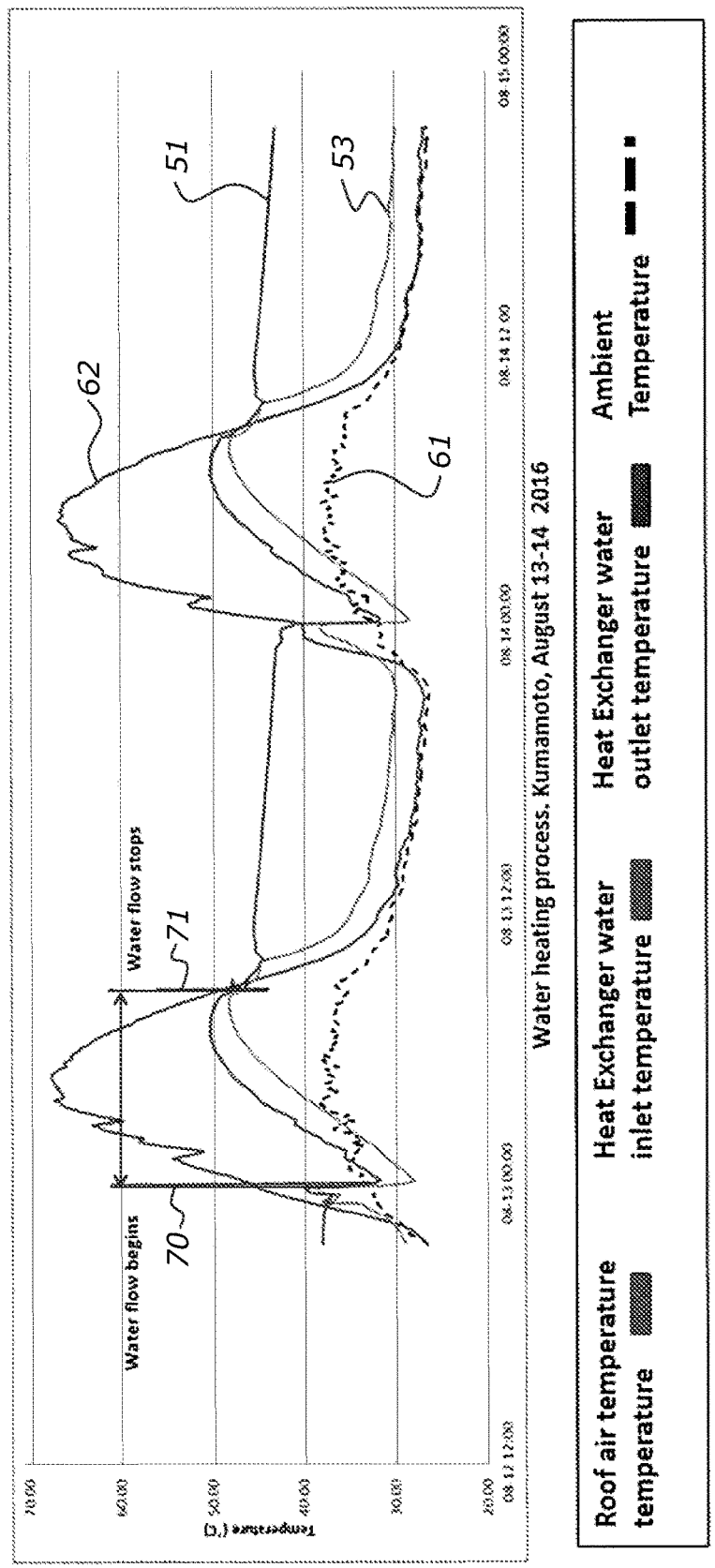
FIG. 15 presents a chart illustrating data from a trial solar thermal collection system for passively heating 250 L of water.

FIG. 15 illustrates data from a further trial solar thermal collection system for passively heating 250 L of water. Once the air provided by the solar system reached a temperature of about 45 degrees C. (at vertical line 70) the water pump (6 L/min) was turned on to pump water around the water circuit 130 and through the passive heat exchanger 134. As can be seen from the chart of FIG. 15, a temperature differential is achieved between the temperatures of the water being provided to the passive heat exchanger (line 53) and the temperature of the water provided by the passive heat exchanger (line 51). The pump was switched off at vertical line 71. The pump may be switched off once the air temperature drops below a threshold e.g. 45 degrees C., or when a difference between the air temperature and the passive heat exchanger inlet water temperature drops below a threshold (e.g. a difference of 10 degrees).

An available (total) thermal energy and a usable thermal energy figure was calculated for the data presented in the chart of FIG. 15. The total thermal energy is calculated as the air mass flow multiplied by the heat capacity of air multiplied by the temperature difference between the heated air temperature provided by the solar system and the ambient air temperature. The usable thermal energy is calculated as the mass flow of the water multiplied by the heat capacity of water multiplied by the temperature difference between the passive heat exchanger 134 water outlet temperature and the passive heat exchanger 134 water inlet temperature. The total energy was calculated as 15.5 kWh/day and the usable energy 5.46 kWh/day. The power consumed to run the water pump and the fan F1 was 0.28 kWh/day, giving a COP for passive water heating of 19.5.

In a passive water heating and passive air heating mode, the state of the various system components is the same as in the passive water heating only mode but for the first air flow outlet valve 124 position which is set to provide the first flow of air 121 to the living space (room).

In an economy heating mode, the state of the various system components is the same as in the passive water and air heating mode but for the first air flow inlet valve 123 position which is set to provide air from the living space to the system heat exchanger(s) 134, 111, e.g. the room air is recirculated through the system. This mode heats the water and the room air.

In a passive air heating or cooling mode, the state of the various system components is the same as in the roof cooling only mode but for the first air flow outlet valve 124 position which is set to provide the first flow of air 121 to the living space (room). Heating or cooling is dependent on the ambient air temperature. For example at night time the outside air temperature may be cool to provide cooling air to the room. During the day time the outside ambient air temperature may have warmed up to provide warm air to the room.

Figure 12:
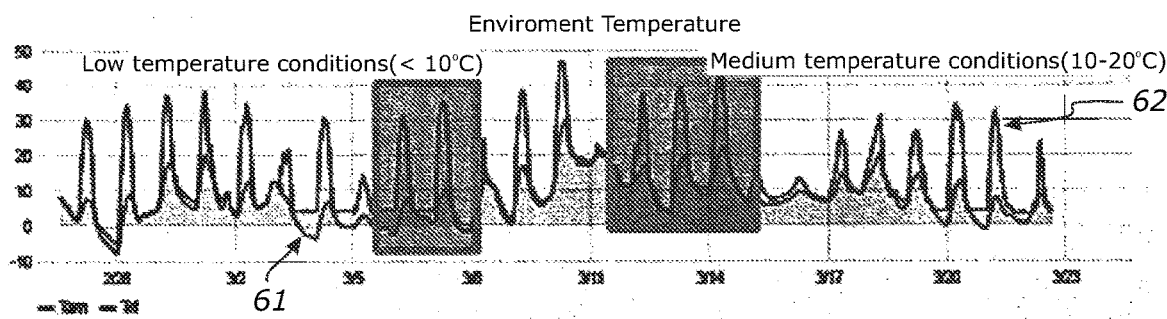
FIGS. 12 to 14 present charts showing ambient air temperature and the temperature of air delivered by a solar thermal collection system.
Figure 12:
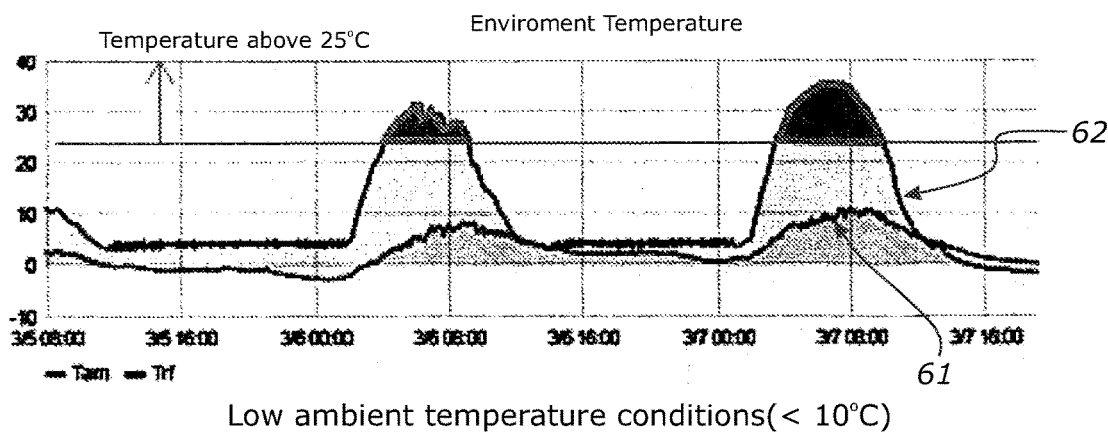
Figure 12:
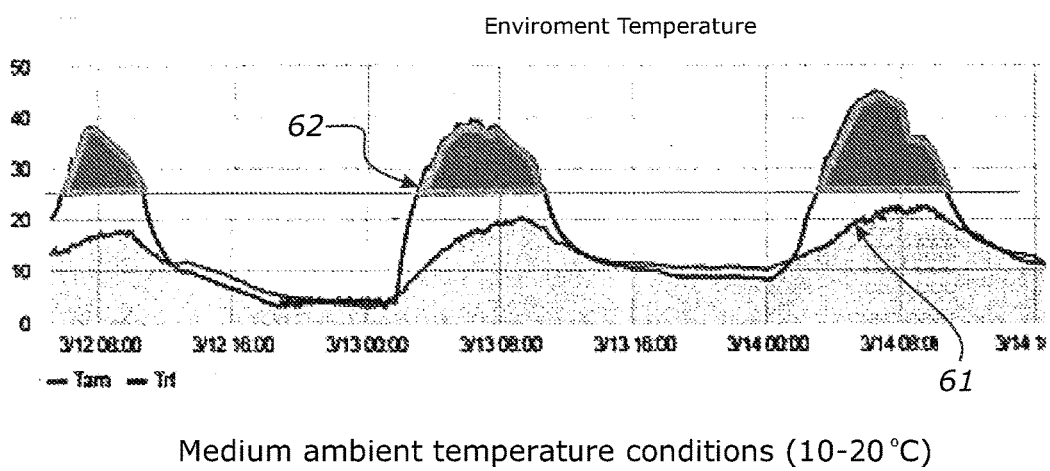
Figure 13:
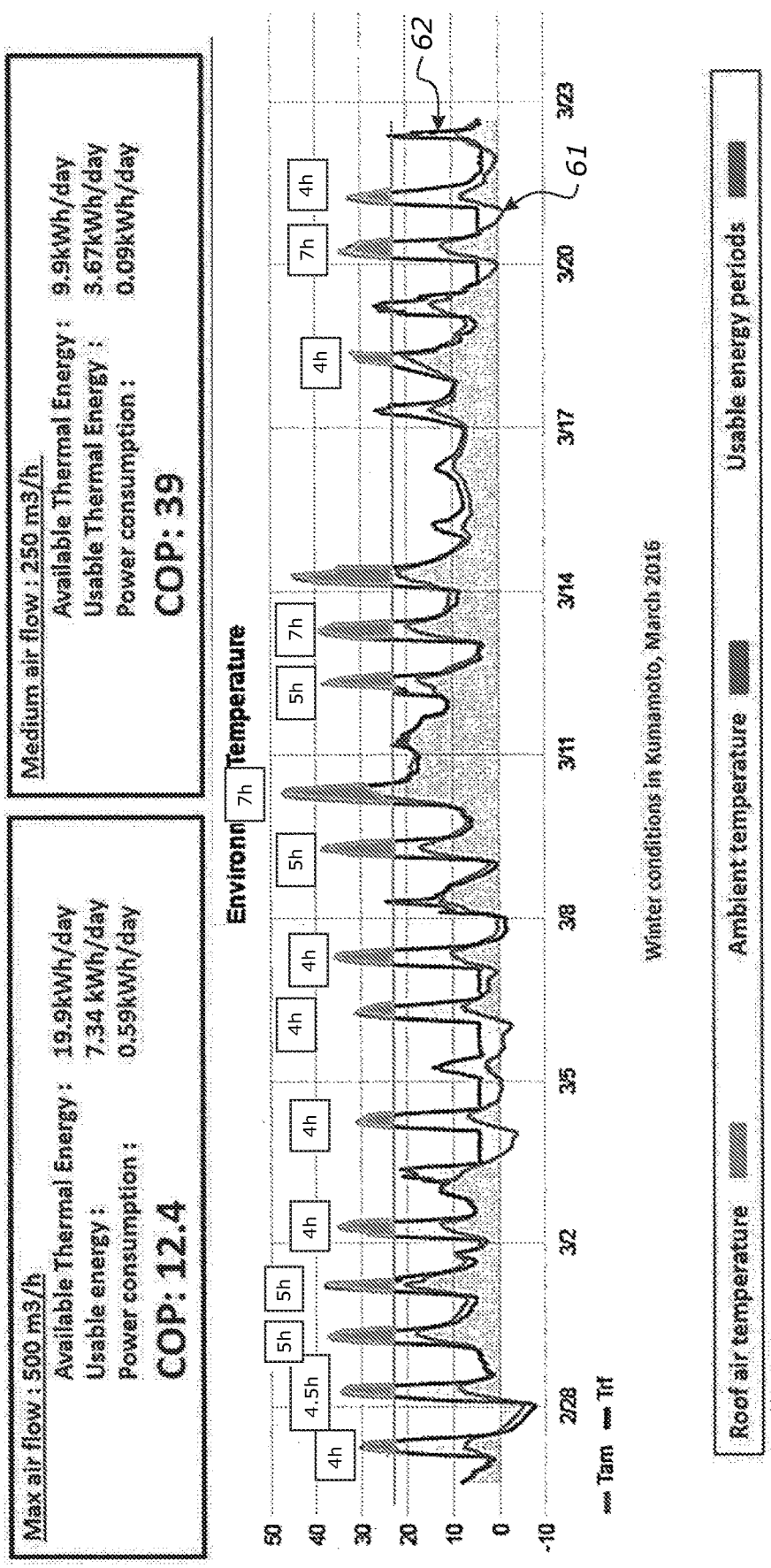
Figure 14:
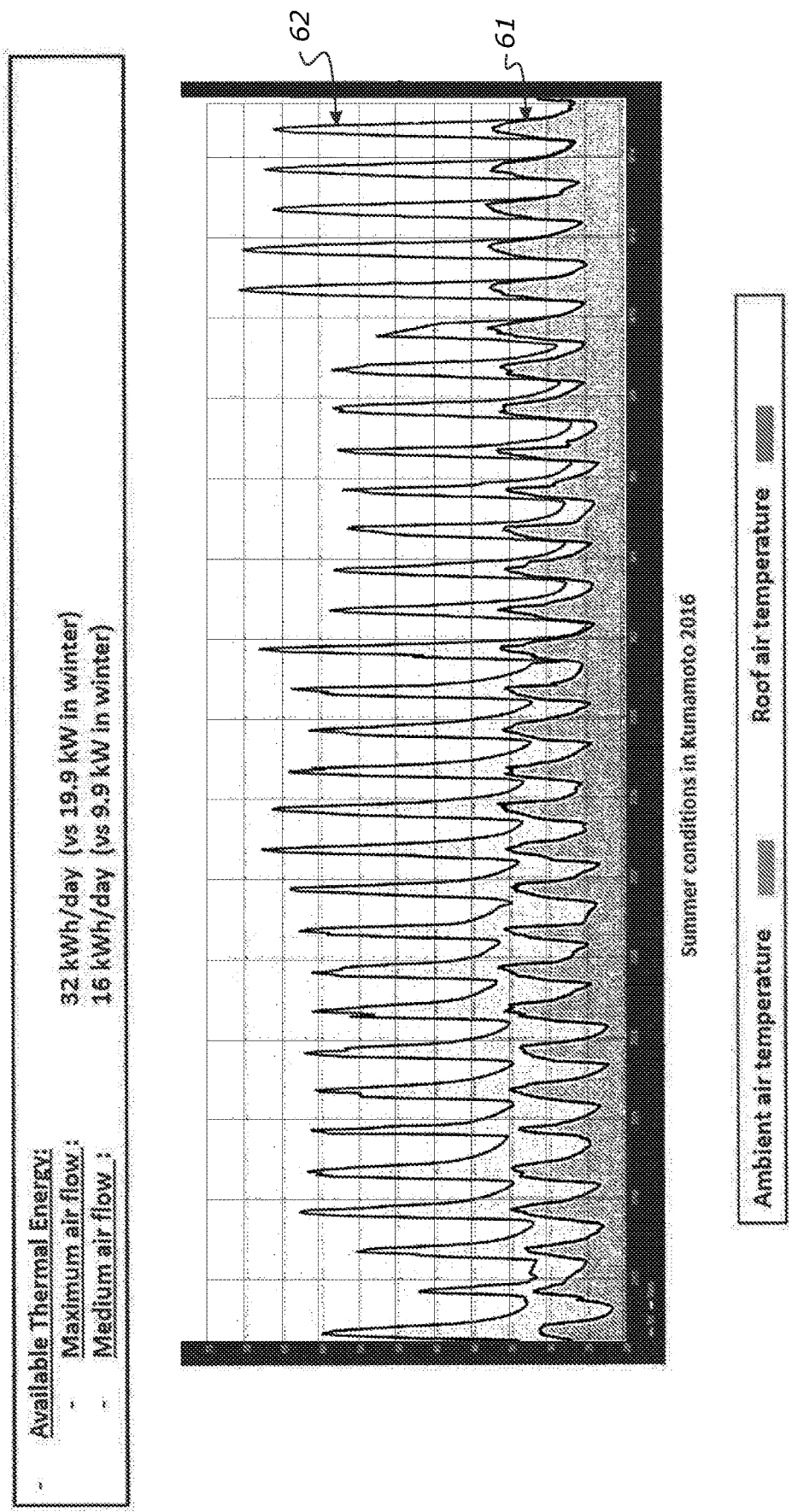

Data collected from a trial of a thermal collection system is presented in FIGS. 12 to 14, showing ambient temperature (line 61) and air temperature (line 62) provided the solar thermal collection system 1. FIGS. 12 and 13 present data for a winter's day. FIG. 14 presents data showing the temperature gradient that is achievable between air heated by a solar thermal system and ambient air during a summer day. For a peak air temperature of around 30 degrees C. a solar heated air temperature of as high as 70 Degrees was achieved. The data presented in FIGS. 12 to 14 is from a trial solar thermal collection system with a solar surface area of 16 m2.

In FIG. 12, the top chart presents data collected over an extended period. The middle and bottom charts in FIG. 12 are portions of the period presented in the top chart. The middle chart presents a period of a low ambient temperature, e.g. less than 10 degrees C. The bottom chart presents a period of higher ambient temperature, e.g. a range of 10 to 20 degrees C. The charts illustrate a 'useable' energy portion of the heated air 62 for passively heating a room being the portion of the air flow above a temperature of 25 degrees C.

FIG. 13 is a chart presenting similar data to FIG. 12, displaying a useable energy portion of the air heated by the solar collection system 1. The trial system was operated at 500 m3/h and 250 m3/h air flow rates. The two different flow rates yielded a temperature gradient between the heated air and the ambient air of about the same. For each flow rate an available thermal energy and a usable thermal energy figure was calculated. The available thermal energy is calculated as the mass flow multiplied by the heat capacity of air multiplied by the temperature difference between the heated air temperature provided by the solar system and the ambient air temperature. The usable thermal energy is calculated as the mass flow multiplied by the heat capacity of air multiplied by the temperature difference between the heated air temperature provided by the solar system and 25 degrees or the ambient air temperature if more than 25 degrees C., as shown by the filled in regions of the chart between the heated air 62 and 25 degrees C. or the ambient temperature 61. As the temperature gradient for the two different air flows was essentially the same, the calculated energy for the 500 m3/h flow is double the calculated energy for the 250 m3/h flow.

A coefficient of performance (COP) was calculated for the two air flows based on the calculated usable thermal energy. As the power consumed by the fan F1 is substantially lower for the lower flow rate of 250 m3/h, the COP for the 250 m3/h flow rate is significantly higher than the COP for the 500 m3/h flow rate. The calculated energy and COP for each flow rate is presented in the table below.

| Flow rate of air through passive heat exchanger | 250 m3/h | 500 m3/h |
|---|---|---|
| Available thermal energy (kWh/day) | 9.9 | 19.9 |
| Useable thermal energy (kWh/day) | 3.67 | 7.34 |
| Power consumption (kWh/day) | 0.09 | 0.59 |
| Coefficient of performance | 39 | 12.4 |

The above data illustrates the very high COP that can be achieved by a solar thermal collection system for heating a living space.

In an active air cooling mode, the heat pump circuit compressor 114 is turned on to circular refrigerant around the heat pump circuit 110. The refrigeration valve 115 is set (indicated by '0' in the table) so that the heat pump circuit first heat exchanger 111 is operational as an evaporator and the second heat exchanger 113 is operational as the second condenser, so that the heat pump circuit is configured to cool the first flow of air 121 passing through the evaporator 111. The first flow of air fan F1 is turned on and the first air flow inlet and outlet valves 123, 124 are set to recirculate the room air through the system. The water pump 131 is turned off.

In an active air heating mode, the state of the various system components is the same as in the active air cooling mode but for the position of the refrigeration valve 115 which is set (indicated by '1' in the table) so that the heat pump circuit first heat exchanger 111 is operational as the second condenser, and the second heat exchanger 113 is operational as the evaporator, so that the heat pump circuit is configured to heat the first flow of air 121 passing through the second condenser 111.

In an active water and air heating mode, the state of the various system components is the same as in the active air heating mode but for activation of the water circuit by turning the water pump 131 on and setting the water bypass valve 133 (indicated by '0' in the table) to bypass the passive heat exchanger 134. The room air is heated by the heat pump second condenser 111 and the water is heated by the heat pump first condenser 112.

In an active water heating and air cooling with air conditioning priority mode, the state of the various system components is the same as in the active water and air heating mode but for the position of the refrigeration valve 115 which is set so that the heat pump circuit first heat exchanger 111 is operational as an evaporator and the second heat exchanger 113 is operational as the second condenser, so that the heat pump circuit is configured to cool the first flow of air 121 passing through the evaporator 111.

In an active water heating and air cooling with water heating (WH) priority mode, the state of the various system components is the same as in the active water heating and air cooling with air conditioning priority mode but for the position of the first air flow inlet valve 123 which is set to receive air from the solar thermal collection system 1 and the fan F2 in the second air flow 122 is turned off. This configuration maximizes the amount of heat being provided to the water since the first air flow 121 provides heat to the refrigerant via the evaporator 111 and maximum heat is transferred from the refrigerant to the water since there is no air flow through the second condenser 113.

In a water heating boost with air cooling mode, the state of the various system components is the same as in the active water heating and air cooling with water heating (WH) priority mode but for the position of the water bypass valve 133 which is set to divert water through the passive heat exchanger 134. This mode boosts heating of the water when the temperature of the air received from the solar thermal collection system is greater than the temperature of the water. Heat is transferred from the first air flow 121 to the water via the passive heat exchanger 134 before the first air flow 121 passes through the evaporator 111. The water is also heated by the first condenser 112.

In a water heating boost mode, the state of the various system components is the same as in the water heating boost with air cooling mode but for the position of the first air flow outlet valve 124 which is set to vent the first air flow 121 to ambient rather than providing the first air flow to the living space.

In an active water heating only mode, the state of the various system components is the same as in the active water heating and air cooling with water heating (WH) priority mode but for the position of the first air flow outlet valve 124 which is set to vent the first air flow to ambient rather than providing the first air flow to the living space. Only heat from the first condenser 112 is provided to the water, since the water bypass valve 133 is set to bypass the passive heat exchanger 134. Thus the active heating only mode is the same as the water heating boost mode but for the passive heat exchanger 134 being bypassed in the water circuit.

The table below shows data collected from a trial of a system according to the present invention in active water heating mode. The heat pump circuit was configured to provide 2 kW of power for cooling the first flow of air for air conditioning the living space, however other capacity heat pump units may be specified, for example 5 kW or greater. As shown in the table, for a 10 degree Celsius air temperature provided to the heat pump circuit evaporator 111 the heat pump provided 1.9 kW of thermal power from the first condenser 112 to the water. The system 100 consumed 0.8 kW, to run the compressor 114, water pump, and fan F1. This resulted in a coefficient of performance for water heating of 2.37. The coefficient of performance for using the heat pump to heat the water using an air temperature of 22 and 40 degrees Celsius provided by a solar collection system is also presented in the table, 2.55 and 2.8 respectively. As the air temperature increases, the increase in thermal power transferred to the water is proportionally greater than the increase in power consumption of the compressor, resulting in an increasing COP for increasing air temperature. Providing a flow of heated air to the heat pump evaporator improves the COP of the heat pump beyond what would be achieved if ambient air were provided. At a temperature of 22 degrees Celsius the 2 kW heat pump used in the trial was capable of delivering about 2 kW of power to cool the first air flow that may be provided to the living space for cooling (e.g. when the system is in the Active water heating and air cooling with water heating priority mode described above). Therefore at 22° C. air temperature, the air cooling coefficient of performance was about 2.22, such that the system 100 operating to actively heat water and cool the living space has a combined coefficient of performance of about 4.77.

| Air temp (° C.) | Thermal power to water (kW) | Power consumption (kW) | COP water heating |
|---|---|---|---|
| 10 | 1.9 | 0.8 | 2.37 |
| 22 | 2.3 | 0.9 | 2.55 |
| 40 | 2.8 | 1.0 | 2.8 |

Figure 10:
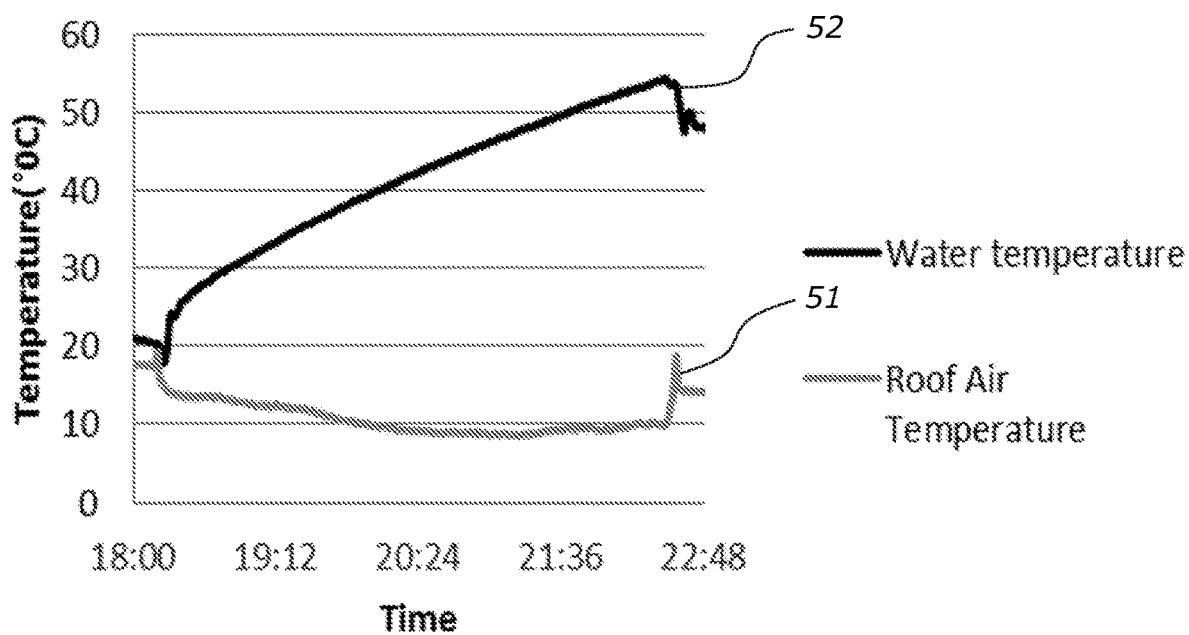
FIG. 10 is a chart illustrating the air supply temperature and water temperature in an active water heating mode.

A chart of temperature vs time for the heating of the water in the water cylinder 132 using active heating only is shown in FIG. 10. For an air temperature (line 51 in FIG. 10) provided to the evaporator 111 of around 10 degrees Celsius, 200 L of water in the water cylinder was heated from about 20 degrees Celsius to about 55 degrees Celsius in about 5 hours (line 52 in FIG. 10).

In a water heating from ambient mode, the fan F1 for driving the first air flow 121 is turned off so that that is no air flowing through the heat pump first heat exchanger 111. The water pump 131 is on and the water bypass valve 133 is set to bypass the passive heat exchanger 111. The fan F2 for the second air flow 122 is on and the refrigeration valve 115 is set so that the heat pump circuit second heat exchanger 113 is configured as an evaporator so that heat is transferred from the second air flow 121 to the refrigerant. With the compressor 114 on heat is transferred from the refrigerant to the water at the first condenser 112.

A further mode available in some embodiments is to use the system 100 to melt snow from the roof surface. Heating may be provided to the first flow of air by the passive heat exchanger and/or the active heat exchanger 111. The cylinder stores hot water. The water in the cylinder may be heated during a time when there is no snow, e.g. during a day time by passive heating from air heated by a solar thermal collection system 1, and/or by a heat pump and/or by an electric element in the cylinder. The hot water stored in the cylinder may be pumped by water pump 131 through the passive heat exchanger. The air 121 flowing through the heat exchanger 134 is heated and provided to the cavity of the solar thermal collection system 1. Hot or warm air may be provided to the cavity, or air at a temperature above 0 degrees C. In some embodiments, the flow of air through the system is reversed, to flow from an outlet of the system to an inlet of the system, as shown in FIG. 4A. Air provided to the outlet of the system may be from the living space or from ambient, e.g. from via a vent opening on the roof ridge. The direction of the fan F1 is changed to reverse the flow of air through the system. The flow of air is therefore directed out of an inlet of the system 100 from the thermal collection unit 4 to the roof cavity 8. The reserved flow of air is directed through the cavity from a top (e.g. at or near a ridge line of the roof) to a bottom of the cavity (e.g. at or near to an eave of the building) to be exhausted from the building. The air flowing through the cavity warms the external roof surface to melt snow resting on the roof surface. Melting snow from the roof is desirable for safety and to improve efficiency of the solar system by removing the snow from the solar collection surface. Heating the roof surface causes the snow to melt from snow to water which runs off the roof surface into guttering of the building at a bottom of the roof surface. In some embodiments, the air flowing from what is typically an inlet of the solar thermal collection system is directed by the inlet into or towards the gutter. This arrangement may assist with ensuring water continues to run from the roof surface and into the gutter without refreezing and may also reduce or prevent the water from refreezing in the gutter, to prevent or reduce ice or ice damns forming in the gutter.

The above described modes are provided as example of the configurability of the system 100 and are not exhaustive. Other useful modes of operation and/or configurations may be useful, depending on various system operational parameters such as ambient air temperature, temperature of air received from the solar thermal collection system and temperature requirements for the water and living space. For example, the second flow of air may be selectably provided to a vent from the building or to the living space.

Figure 11:
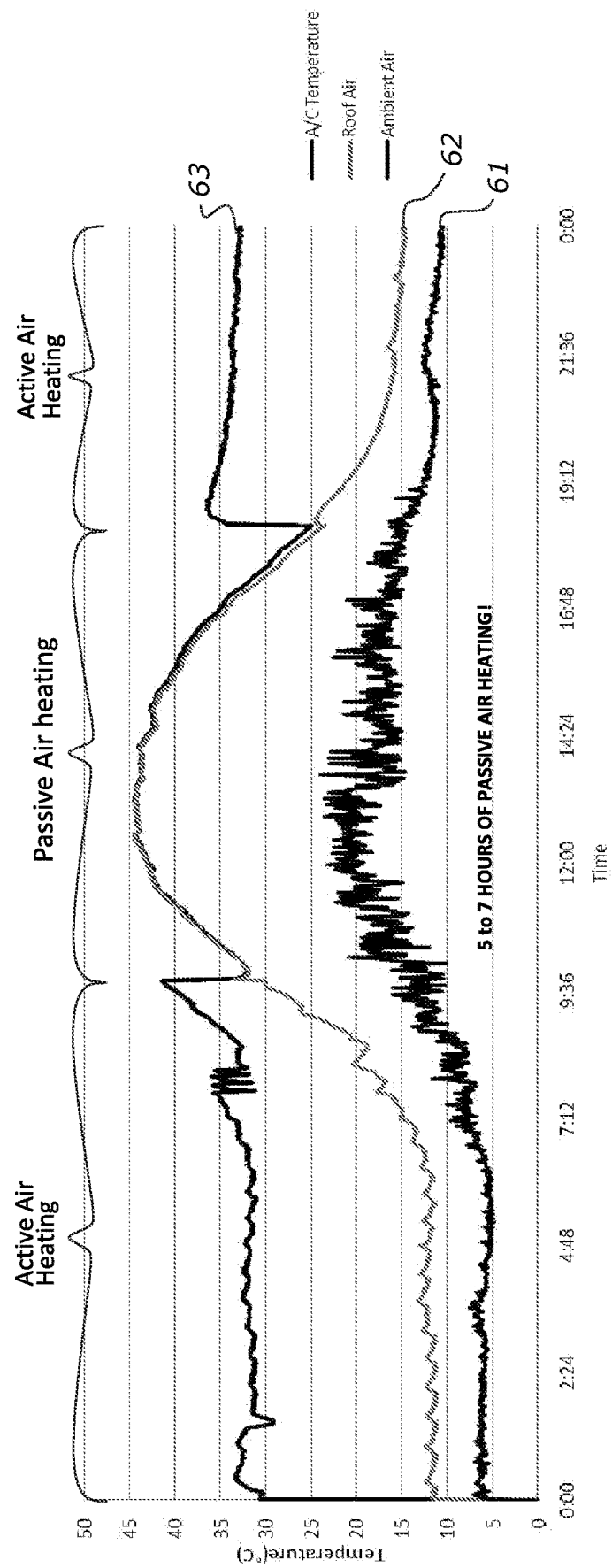
FIG. 11 is a chart illustrating air temperatures in a winter time living space air heating mode.

Additionally, different modes may be sequenced together to improve the overall efficiency of the system. For example, in a winter time living space air heating mode, during night time where the outside air is cooler the system 100 may operate in an active air heating mode with the heat pump circuit operating to heat the first flow of air to the living space. During day time hours or when the temperature of the first air flow 121 reaches a temperature threshold, the system may switch from an active air heating mode to a passive air heating mode. Such an arrangement is illustrated by the chart in FIG. 11. In FIG. 11 the outside air temperature (line 61 in FIG. 11) is around 5 to 10 degrees during night time hours, which the solar collection system converts to a first air flow 121 temperature (line 62 in FIG. 11) of about 12 to 30 degrees, and an outside air temperature of about 10 to 25 degrees during day time hours which the solar collection system converts to a first air flow 121 temperature of about 25 to 45 degrees. The system provides a flow of air 121 to the living space with a temperature (line 63 in FIG. 11) of about 30 to 40 degrees during the night and about 25 to 45 degrees during the day.

Similarly, the system may be run in a passive water heating mode and then when passive solar energy is no longer sufficient the system may switch to an active water heating mode. For example, with reference to FIG. 15 discussed above for passive water heating, instead of turning the water pump off at vertical line 71, the pump could remain running and the heat pump compressor could turn on to being active water heating via the first condenser 112. Active heating is always available, whereas passive is only available for a portion of time e.g. during a portion of daylight hours. A user may operate the system 100 to achieve maximum heating efficiency. Alternatively, a user may operate the system 100 for maximum heating to heat water or a room as quickly as possible.

Even when the system is operating in an active heating or cooling mode using the heat pump circuit, providing air heated by a solar thermal collection system 1 to the heat pump first heat exchanger 111 boosts the efficiency of the heat pump. Heat pumps do not work well at low incoming air temperatures, e.g. below about 5 degrees C. Air provided from the roof solar heating system boosts efficiency of the heat pump by providing an air temperature to the heat exchanger 111 at a temperature significantly greater than the ambient temperature. For example for an ambient air temperature of 2-3 degrees, the solar system may generate an air temperature of around 10-15 degrees C. to the heat exchanger 111, which increases the coefficient of performance of the heat pump. Houses in cold climates may have a heat pump for air conditioning (cooling) and a gas heating system for heating since a heat pump does not work well at low ambient temperatures. Providing a solar thermal collection system to provide a warmed flow of air to the heat pump circuit can negate the need for an additional gas heating system.

Figure 5:
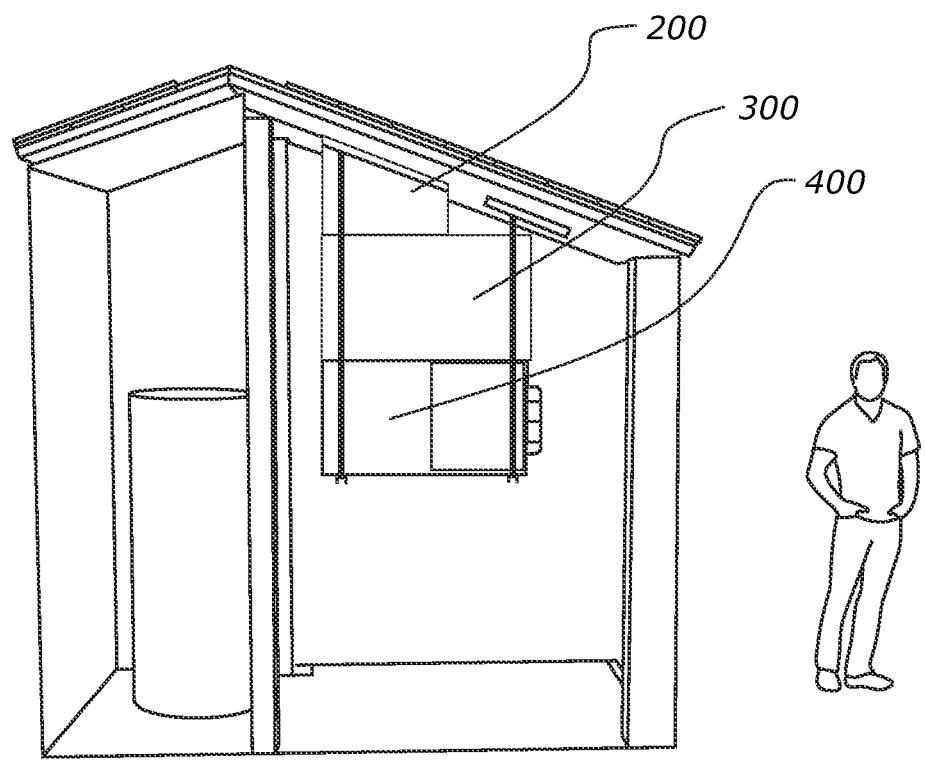
FIG. 5 is a diagram of an attic or roof space including a house hold heated water cylinder and a system for providing air conditioning to a living space.

In some embodiments the system 100 is provided as a modular system allowing for flexibility in installation. In some embodiments, the system comprises a thermal collection unit 200, a heat exchanger unit 300, and a 5 kW heat pump unit 400, as shown in FIGS. 5 and 6A to 6E. In FIG. 5 and in FIG. 6, the three modules are arranged in a vertical assembly configuration, with the thermal collection unit 200 mounted at a top of the assembly and the heat pump module 400 at the bottom of the assembly. The three modules may be fixed together, for example by bolting. The vertical arrangement of FIGS. 5 and 6A may be suitable for open attic spaces higher than 1.7 m.

Figure 6A:
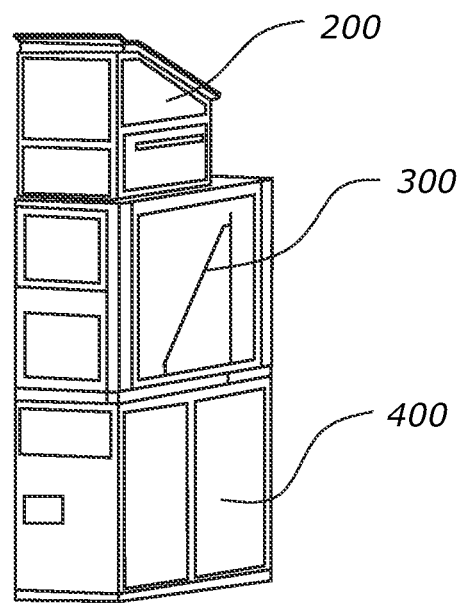
FIGS. 6A to 6E show a modular system for providing air conditioning to a living space.
Figure 6B:
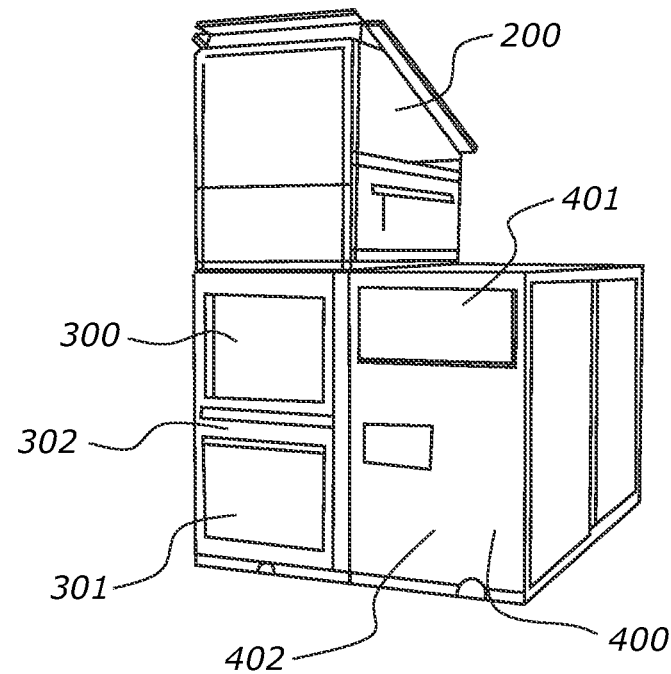

In FIG. 6B, the modules 200, 300, 400 are arranged in a compact horizontal assembly configuration, with the collection unit 200 mounted on top of the heat exchanger unit 300, and the heat pump unit 400 located in a side-by-side arrangement with the heat exchanger unit 300. The compact horizontal arrangement is suitable for open attic spaces with a height of less than 1.7 m. The heat exchanger unit and the heat pump unit each have connectors for connecting water and refrigeration pipes, as described below with reference to FIG. 7. In some embodiments, the water inlet/outlet and refrigeration inlet/outlet connections are provided at corresponding ends of the heat exchanger and heat pump units. For example in FIG. 6B the heat exchanger unit has connections 301 at an end 302 of the unit and the heat pump unit has connections 401 at a corresponding end 402 of the heat pump unit.

Figure 6C:
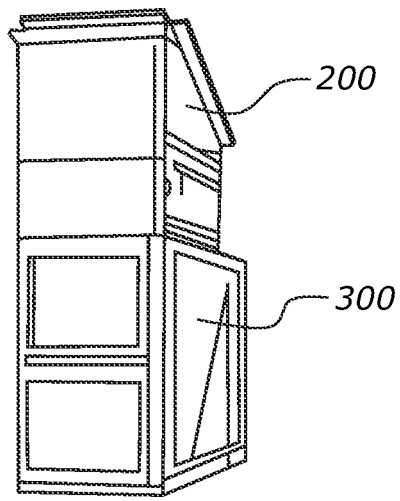
Figure 6C:
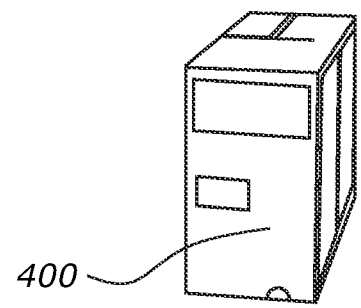

In FIG. 6C, the solar thermal collection unit 200 is mounted on top of the heat exchanger unit 300. The heat pump unit 400 is located away from the collector unit 200 and the heat exchanger unit 300, e.g. rather than in a close side-by-side arrangement as in FIG. 6B, in FIG. 6C the heat pump unit 400 may be located a distance from the heat exchanger unit, e.g. in the order of for example 0.5 m to 20 m. The configuration of FIG. 6C is suitable for ceiling spaces with reduced accessibility or space, e.g. when roof trusses provide reduced accessibility.

Figure 6D:
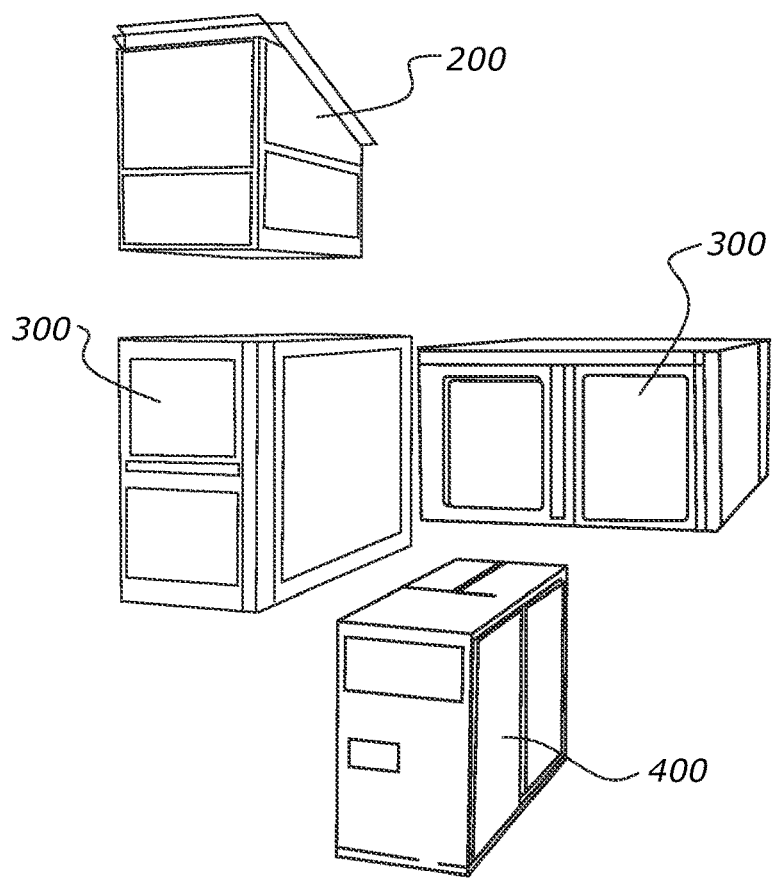

In FIG. 6D the three modules are shown separated. The three modules 200, 300, 400 are connected together by ducting, lengths of water and refrigeration conduits, and electrical cables. The heat pump module 400 is preferably arranged in a single orientation, i.e. one side always being a top side of the unit, due to the unit including a compressor that may need to be oriented correctly. However, in some embodiments the heat exchanger unit 300 may be oriented in more than one direction. For example FIG. 6D illustrates the heat exchanger unit 300 in a vertical configuration and a horizontal configuration. The complete split assembly configuration shown in FIG. 6D is most suitable for ceiling spaces with a much reduced accessibility. Only the thermal collector 200 is attached to the roof. The heat exchanger unit 300 can be ducted to the collection unit and can be installed in a space with easier access, for example a basement or garage or a location where the house hot water cylinder is located. The heap pump unit 400 may be located in another space with easy access or can be installed out of the ceiling space if necessary.

Figure 6E:
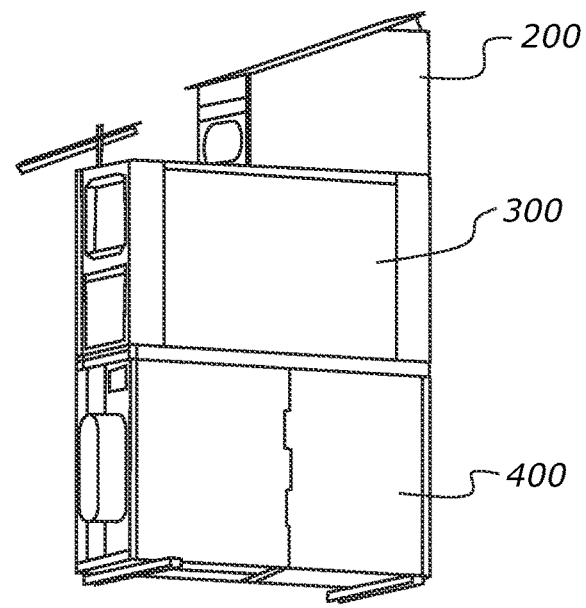

FIG. 6E shows the three modules 200, 300, 400 in the vertical assembly configuration of 6A but with the thermal collection unit 200 turned 180 degrees. Thermal collection unit 200 and the heat exchanger unit 300 are adapted so that the thermal unit can be attached to the heat exchanger unit in both a first orientation (e.g. FIG. 6A) and a second orientation (e.g. FIG. 6E), the first orientation at 180 degrees to the second orientation (about a vertical axis). This configurability adds further flexibility for installation in confined spaces.

Figure 7:
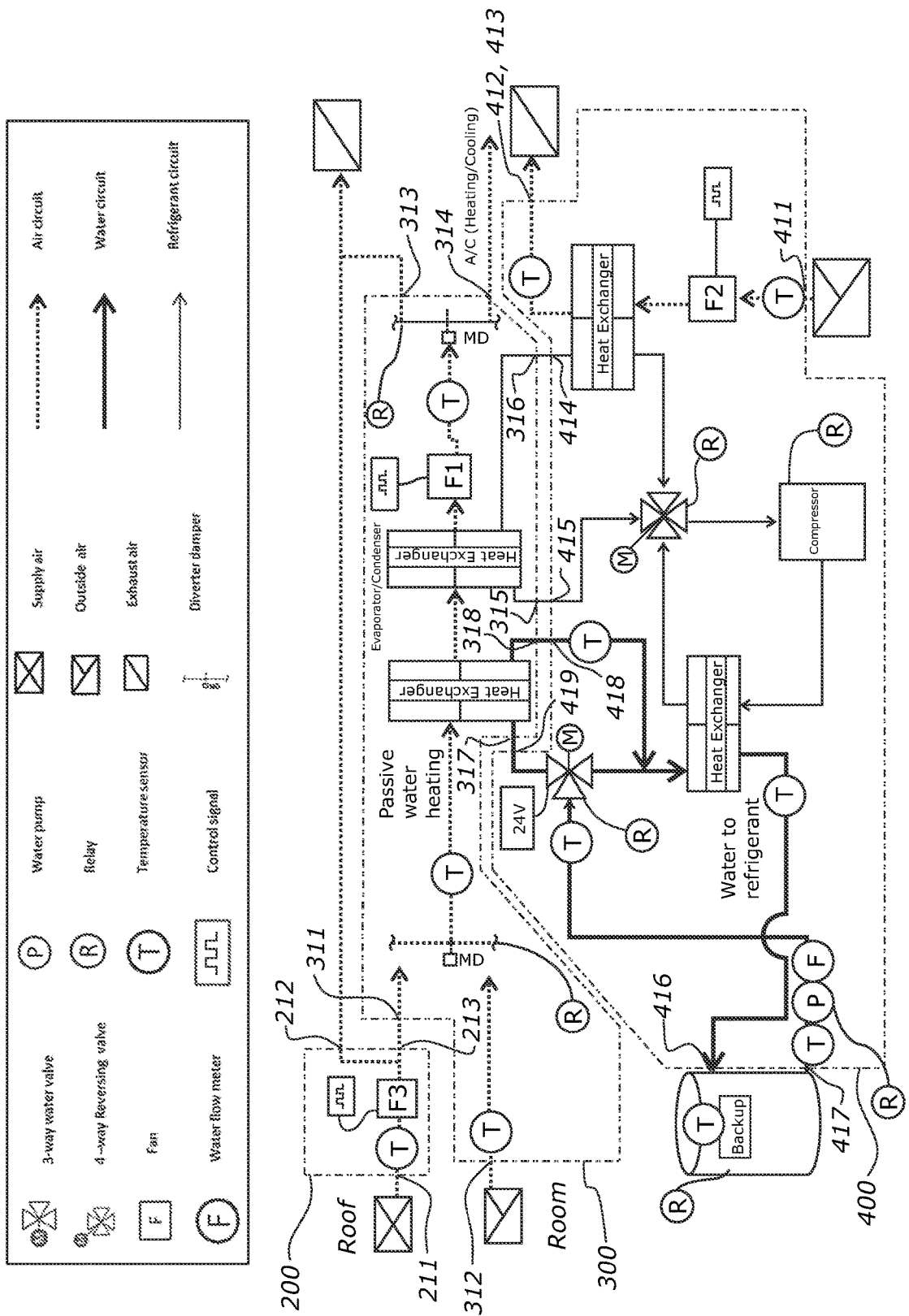
FIG. 7 is a schematic of the system of FIG. 4 but with modules of the system indicated by dashed boundary lines.

FIG. 7 is the schematic of FIG. 4 but with dashed boundary lines indicating the enclosures of the thermal collection unit 200, the heat exchanger unit 300 and the heat pump unit 400. In some embodiments, the thermal collection unit 200 is a duct or hood for mounting underneath the external roofing membrane to communicate with a cavity between the external membrane and an underlying support material of the building structure. The unit may comprise a box or thermal box. The box may be adapted to interface with a range of different roof pitches. For example the box may be in two parts, with a top part pivotable with a bottom part to pivot through a range to match a range of roof pitches. In some embodiments the collection unit may comprise a fan F3 for directing flow from the roof cavity into the collection unit and/or from the collection unit to the heat exchanger module and/or a vent from the building. The unit may also include one or more sensors, e.g. temperature sensors, to provide an indication of the temperature of air being received by or delivered from the unit.

In some embodiments, the heat exchanger unit 300 may comprise the first heat exchanger 111 of the heat pump circuit 110. In some embodiments the first heat exchanger 111 is operable as an evaporator and a condenser depending on a direction of refrigerant being cycled through the heat exchanger (from the heat pump unit). The heat exchanger unit 300 may also comprise a fan F1 for driving a flow of air 121 through the unit. The unit 300 may include an inlet valve 123 to select a flow of air to be received from two different sources, e.g. from the thermal collection unit and from an ambient air supply. The unit may include an outlet valve 124 to selectively deliver a flow of air from the unit to two different destinations, e.g. to the living space or to a vent from the building. The heat exchanger module 300 may also comprise the passive heat exchanger 134 in the air flow through the unit to receive water from the heat pump unit or a house water cylinder (FIG. 8). The heat exchanger unit may also comprise sensors, as previously described with reference to FIG. 4.

In some embodiments, the heat pump module 400 may comprise the heat pump circuit compressor 114, the first condenser 112 and the second condenser 113. In some embodiments, the module also comprises the refrigerant reversing valve 115, in which case the second condenser 113 is operable as an evaporator. In some embodiments the module 400 also comprises a fan F2 to provide a flow of air 122 through the module 400 through the second condenser/evaporator 113. In addition to refrigerant pipes, the heat pump module 400 also may comprise a water pump 131 and water pipes to direct the water through the first condenser 112. In some embodiments the module also comprises water pipes and a valve 133 to selectively direct water to and from the unit to communicate with corresponding water pipes in the heat exchanger unit 200 for communication with the passive heat exchanger 1343. The heat pump module 400 may also include sensors as described previously with reference to FIG. 4.

In order to connect the three modules 200, 300, 400 together and to connect the system to a solar thermal energy collection system 1, a house hold water tank 132, air ducts to and from the living space, and air ducts and to and from the ambient environment, each module may include the connections listed below (reference numerals provided in FIG. 7).

Thermal Collection Unit 200:
Air inlet 211 (to receive air from the solar thermal collection system)
Air outlet 212 (to vent from building)
Air outlet 213 (to heat exchanger unit)
Electrical power connector (for fan, sensors)
Heat Exchanger Unit
Air inlet 311 (from thermal collector unit)
Air inlet 312 (from the room)
Air outlet 313 (to vent from building)
Air outlet 314 (to room)
Refrigerant inlet/outlet 315 (from the heat pump module)
Refrigerant outlet/inlet 316 (to the heat pump module)
Water inlet 317 (from the heat pump module)
Water outlet 318 (to the heat pump module)
Electrical power connector (for fan, sensors, valves)
Heat Pump Module
Air inlet 411 (from ambient)
Air outlet 412 (to vent from building)
Air outlet 413 (to room)
Refrigerant inlet/outlet 414 (from the heat exchanger module)
Refrigerant outlet/inlet 415 (to the heat exchanger module)
Water inlet 416 (from the water storage tank)
Water out 417 (to the water storage tank)
Water inlet 418 (from the heat exchanger module)
Water outlet 419 (to the heat exchanger module)
Electrical power connector (for compressor, water pump, fan, sensors, valves).

Dividing the system into the modules or units 200, 300, 400 as described above provides for a number of benefits. As described, the units may be configured together or separately in different ways to provide for flexibility in installation. Furthermore, configurability is provided by the particular arrangement of the various system components within each unit. By arranging the system components into the units as described with reference to FIG. 7, each unit 200, 300, 400 is adapted for use independently of the others. For example, as the collector unit comprises a fan, the collector unit may be used as a standalone unit together with a solar thermal collection system 1 to provide heated air to a living space in a 'fan only' installation.

A home owner may wish to install only the solar thermal collection system and the collector unit 200 without installing the heat exchanger module 300 or the heat pump module 300. A home owner may then decide at a later date to upgrade the 'fan only' system by installing the heat exchanger unit 300 (a 'passive only' system) or the heat pump unit 400 (an 'active only' system) for use together with the collector unit 200. Or an owner may decide to add both the heat exchanger unit 300 and the heat pump unit 400 for use together with the collector unit 200 to achieve a 'passive and active' system.

Where the heat exchanger unit is to be used without the heat pump unit to provide passive water heating, the refrigeration lines are plugged off and the heat pump circuit exchanger 111 is redundant. Where the heat pump unit is used without the heat exchanger unit to provide active water heating, the inlet and outlet water connections to the heat exchanger unit are plugged off and the refrigeration pipe connections are coupled together to complete the heat pump circuit. In this configuration the water valve 133 and refrigeration valve 115 are redundant. The outlet from the thermal collection unit may be ducted to the air inlet of the heat pump unit so that heated air is provided to the evaporator 113 to improve the COP. The heat pump unit can be used independently of both the collector unit 200 and the heat exchanger unit 300 however the COP would be reduced. Similarly the heat exchanger unit 300 could be used independently of both the collector unit and the heat pump unit to provide heating to the flow of air 121 to the living space by the water circuit 130. An air flow from the living space could be recirculated through the heat exchanger unit.

The foregoing description of the invention includes preferred forms thereof. Modifications may be made thereto without departing from the scope of the invention as defined by the accompanying claims.

The invention claimed is:

1. A system for providing air conditioning to a living space and heating potable water, the system comprising:
   a heat pump circuit, and a water circuit,
   the heat pump circuit comprising:
      a compressor for circulating a refrigerant around the heat pump circuit, a first condenser, a second condenser, and an evaporator,
      the evaporator adapted to receive a first flow of air from an air inlet to transfer heat from the first flow of air to the refrigerant, the first condenser adapted to receive a flow of water to transfer heat from the refrigerant to the water, the second condenser adapted to receive a second flow of air to transfer heat from the refrigerant to the second flow of air, and an air outlet to provide the first flow of air from the evaporator to the living space, wherein the heat pump circuit comprises:

a first heat exchanger configurable as the evaporator or the second condenser, a second heat exchanger configurable as the second condenser or the evaporator, and a valve for selecting the direction of flow of refrigerant in the heat pump circuit through the first and second heat exchangers, and wherein the first condenser is located within the heat pump circuit between the compressor and the valve, the water circuit comprising:

a water tank and a pump for pumping water from the tank and through the first condenser to be returned to the tank, and a water circuit heat exchanger for receiving the water from the water circuit and the first flow of air to transfer heat between the water and the first flow of air, wherein the water circuit is arranged such that:

the water circuit heat exchanger and the evaporator, or a first heat exchanger of the heat pump circuit, are arranged in the first flow of air in series, and the water circuit heat exchanger is a passive heat exchanger, positioned in the first flow of air upstream of the evaporator, or a first heat exchanger of the heat pump circuit.

2. The system as claimed in claim 1, wherein the first flow of air is a heated flow of air.

3. The system as claimed in claim 1, further comprising a thermal collection unit to collect heated air from a solar thermal collection system for providing the first flow of air.

4. The system as claimed in claim 1, further comprising a valve for selectively providing as the first flow of air:

i) heated air from a solar thermal collection system from a thermal collection unit, and ii) a flow of air from the living space such that the first flow of air recirculates through the system and the living space.

5. The system as claimed in claim 1, comprising a vent path to bypass the evaporator and vent the first flow of air to an ambient environment.

6. The system as claimed in claim 1, comprising a fan for driving the first flow of air through the evaporator and to the living space, or through a vent path.

7. The system as claimed in claim 1, wherein the second flow of air is an ambient flow of air.

8. The system as claimed in claim 1, comprising a fan for driving the second flow of air through the second condenser.

9. The system as claimed in claim 1, wherein the second flow of air is vented to ambient after passing through the second condenser.

10. The system as claimed in claim 1, comprising a valve for selectively providing the first flow of air from the evaporator to i) the living space, and ii) a vent to ambient.

11. The system as claimed in claim 1, wherein:

with the valve in a first position:

the first heat exchanger configured as the evaporator to receive the first flow of air and transfer heat from the first flow of air to the refrigerant, and the second heat exchanger configured as the second condenser to receive the second flow of air to transfer heat from the refrigerant to the air, and with the valve in a second position:

the first heat exchanger configured as the second condenser to receive the first flow of air and transfer heat from the refrigerant to the first flow of air, and the second heat exchanger configured as the evaporator to receive the second flow of air to transfer heat from the second flow of air to the refrigerant, the system adapted to provide the first flow of air from the first heat exchanger to the living space to condition the air in the living space, and the first condenser adapted to receive the flow of water to transfer heat from the refrigerant to the water when the valve is in the first and second positions.

12. The system as claimed in claim 1, wherein the water circuit comprises a valve for selectively bypassing the water circuit heat exchanger or the passive heat exchanger.

13. The system as claimed in claim 1, wherein the water circuit heat exchanger and the evaporator or first heat exchanger of the heat pump circuit are arranged in the first flow of air in series.

14. The system as claimed in claim 3, wherein the thermal collection unit is a box or duct.

15. The system as claimed in claim 3, wherein the thermal collection unit comprises any one of the following:

i) two outlets, a first outlet for providing a flow of air to the evaporator or a first heat exchanger and a second outlet for providing a flow of air to a vent from the system, or ii) a fan for driving a flow of air to a vent outlet or an outlet to the evaporator or a first heat exchanger.

16. The system as claimed in claim 1, wherein the system comprises modular units.

17. The system as claimed in claim 16, wherein the modular units are adapted to be configured together or separately by interconnecting ducts and communication pipes to provide for flexibility in installation.

18. The system as claimed in claim 16, wherein the system comprises a thermal collection unit, a heat exchanger unit, and a heat pump unit.

19. The system as claimed in claim 18, wherein the thermal collection unit, the heat exchanger unit, and the heat pump unit are adapted to be arranged with the thermal collection unit mounted on top of the heat exchanger unit, and the heat pump unit located in a side-by-side arrangement with the heat exchanger unit to achieve a compact height configuration.

20. The system as claimed in claim 18, wherein the heat exchanger unit comprises one or more of:

i) the evaporator or first heat exchanger of the heat pump circuit, ii) a fan for driving the first flow of air through the heat exchanger unit, iii) an inlet valve to select a flow of air to be received from two different sources, iv) an outlet valve to selectively deliver a flow of air from the heat exchanger unit to two different destinations, or v) a water circuit heat exchanger or a passive heat exchanger.

21. The system as claimed in claim 18, wherein the heat pump unit comprises one or more of:

i) at least one of a compressor, the first condenser, the second condenser, or a second heat exchanger, ii) a refrigerant reversing valve,
iii) a fan to provide a flow of air through the heat pump unit through the second condenser or a second heat exchanger,
iv) a water pump to pump the water through a water circuit including the first condenser, or
v) a valve to selectively direct the water to and from the heat pump unit to communicate with corresponding water pipes in the heat exchanger unit for communication with a passive heat exchanger.

22. The system as claimed in claim 21, comprising a controller and one or more sensors in communication with the controller, the one or more sensors comprising any one or more of: a temperature sensor downstream of the heat pump circuit, a first heat exchanger, or the evaporator to indicate a temperature of aft being provided to the living space, a temperature sensor upstream of the first heat exchanger or a passive heat exchanger indicating a temperature of air being received from a solar thermal collection system, a temperature sensor upstream of the first heat exchanger or a passive heat exchanger indicating a temperature of air being returned from the living space or provided from ambient, one or more temperature sensors arranged in the second flow of aft, to indicate a temperature of ambient air being provided to the second condenser or a second heat exchanger, or a temperature of a flow of air being exhausted from the second condenser or the second heat exchanger, one or more temperature sensors in a water circuit to indicate a temperature of the water being provided to and from a water cylinder, or a flow rate sensor for indicating a flow rate of the water in a water circuit.

23. The system as claimed in claim 22, wherein the controller receives a signal from each said temperature sensor and determines an indication of thermal energy transferred to the water by the system and provides an output indicative of said thermal energy.

24. The system as claimed in claim 22, wherein the controller receives as an input a cost per unit of energy for water heating and determines from thermal energy transferred to the water by the system a cost saving provided by the system, and the controller providing an output indicative of said cost saving.

25. The system as claimed in claim 1, wherein a heat exchanger, configurable as the evaporator and adapted to receive a flow of air from an air inlet, transfers heat from the water to the flow of air from the air inlet, and an air outlet to provide the flow of air heated by passing through the heat exchanger to the living space.

26. The system as claimed in claim 1, wherein the system further comprises a liquid receiver or reservoir configured to add refrigerant to the heat pump circuit or remove refrigerant from the heat pump circuit.

27. The system as claimed in claim 26, wherein the liquid receiver or reservoir provides for an additional source of a volume of refrigerant for addition to the heat pump circuit, and provides for storage of refrigerant removed from the heat pump circuit.

28. The system as claimed in claim 26, wherein the liquid receiver or reservoir is configured to add refrigerant to the heat pump circuit when a heating demand on the system increases, is high relative to a predetermined operating condition, or is above a threshold.

29. The system as claimed in claim 26, wherein the liquid receiver or reservoir is configured to add refrigerant to the heat pump circuit when a heat load on the system decreases, is low relative to a predetermined operating condition, or is below a threshold.

30. The system as claimed in claim 26, wherein the liquid receiver or reservoir is configured to remove refrigerant from the heat pump circuit when a heating demand on the system decreases, is low relative to a predetermined operating condition or is below a threshold.

31. The system as claimed in claim 26, wherein the liquid receiver or reservoir is configured to remove refrigerant from the heat pump circuit when a heat load on the system increases, is high relative to a predetermined operating condition, or is above a threshold.

32. The system as claimed in claim 26, wherein the liquid receiver or reservoir is configured to maintain a substantially constant pressure in the heat pump circuit.

33. The system as claimed in claim 32, wherein if the pressure in the heat pump circuit decreases, the liquid receiver or reservoir is configured to add refrigerant to the heat pump circuit to maintain said substantially constant pressure.

34. The system as claimed in claim 32, wherein if the pressure in the heat pump circuit increases, the liquid receiver or reservoir is configured to remove refrigerant from the heat pump circuit to maintain said substantially constant pressure.

35. The system as claimed in claim 26, wherein the liquid receiver or reservoir is located after the first condenser and the second condenser, and before the evaporator.

36. The system as claimed in claim 26, wherein the liquid receiver or reservoir is located between a first heat exchanger and a second heat exchanger in the heat pump circuit.

37. The system as claimed in claim 26, wherein the liquid receiver or reservoir is located before an expansion valve in the heat pump circuit.

38. The system as claimed in claim 28, wherein the liquid receiver or reservoir is configured to add refrigerant to the heat pump circuit when the first condenser is configured to heat the water.

39. The system as claimed in claim 30, wherein the liquid receiver or reservoir is configured to remove refrigerant from the heat pump circuit when the first condenser is not configured to heat the water.

40. The system as claimed in claim 26 wherein the liquid receiver or reservoir is located between a first heat exchanger and a second heat exchanger in the heat pump circuit when the valve is in both the first position and the second position.

* * * * *

UNITED STATES PATENT AND TRADEMARK OFFICE
CERTIFICATE OF CORRECTION

PATENT NO. : 11,530,831 B2
APPLICATION NO. : 16/485280
DATED : December 20, 2022
INVENTOR(S) : Andrew Leo Haynes and Daniel Fernandez Gonzalez It is certified that error appears in the above-identified patent and that said Letters Patent is hereby corrected as shown below:

In the Claims

Column 27, Claim 22, Line 16, change --aft-- to air.

Column 27, Claim 22, Line 24, change --aft-- to air.

Signed and Sealed this
Fourteenth Day of March, 2023

Katherine Kelly Vidal
*Director of the United States Patent and Trademark Office*